US012641225B2

(12) United States Patent (10) Patent No.: US 12,641,225 B2
Kim et al. (45) Date of Patent: May 26, 2026

(54) IMAGE ENCODING/DECODING METHOD USING NEURAL NETWORK-BASED IN-LOOP FILTER, DEVICE, AND RECORDING MEDIUM STORING BITSTREAM

(71) Applicant: INDUSTRY ACADEMY COOPERATION FOUNDATION OF SEJONG UNIVERSITY, Seoul (KR)

(72) Inventors: Hyun Gyu Kim, Seoul (KR); Dae Yeon Kim, Seoul (KR); Yung-Lyul Lee, Seoul (KR); Yang Woo Kim, Seoul (KR); Myung Jun Kim, Seoul (KR); Nam Uk Kim, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 120 days.

(21) Appl. No.: 18/579,854

(22) PCT Filed: Jul. 7, 2022

(86) PCT No.: PCT/KR2022/009818
§ 371 (c)(1),
(2) Date: Jan. 16, 2024

(87) PCT Pub. No.: WO2023/287104
PCT Pub. Date: Jan. 19, 2023

(65) Prior Publication Data
US 2024/0333923 A1 Oct. 3, 2024

(30) Foreign Application Priority Data
Jul. 15, 2021 (KR) ........................ 10-2021-0092720

(51) Int. Cl.
*H04N 19/00* (2014.01)
*G06T 5/20* (2006.01)
(Continued)

(52) U.S. Cl.
CPC .............. *H04N 19/117* (2014.11); *G06T 5/20* (2013.01); *G06V 10/44* (2022.01); *H04N 19/124* (2014.11); *H04N 19/186* (2014.11); *H04N 19/82* (2014.11)

(58) Field of Classification Search
None
See application file for complete search history.

(56) References Cited

U.S. PATENT DOCUMENTS 11,677,948 B2 * 6/2023 Besenbruch ............ G06T 9/002
375/240.03
2020/0154145 A1 * 5/2020 Du ....................... G06F 18/2163
(Continued)

FOREIGN PATENT DOCUMENTS

JP 2020-185390 A 11/2020
KR 10-2020-0000548 A 1/2020
(Continued)

OTHER PUBLICATIONS

Wang. "Attention-Based Dual-Scale CNN In-Loop Filter for Versatile Video Coding". Sep.-Oct. 2019. (Year: 2019).*
(Continued)

*Primary Examiner* — Zhihan Zhou
(74) *Attorney, Agent, or Firm* — BROADVIEW IP LAW, PC

(57) ABSTRACT

An image decoding method using a neural network-based in-loop filter may comprise obtaining a first image feature from an input image, obtaining a block information feature of the input image from block information of the input image, obtaining a second image feature by removing noise (Continued)

and distortion of the first image feature based on the block information feature, and reconstructing the input image based on the second image feature. The block information may comprise at least one of a block boundary map indicating a block partition structure of the input image or a block distribution map indicating encoding information of the input image.

14 Claims, 14 Drawing Sheets

(51) Int. Cl.
| | | |
|---|---|---|
| *G06V 10/44* | (2022.01) | |
| *H04N 19/117* | (2014.01) | |
| *H04N 19/124* | (2014.01) | |
| *H04N 19/186* | (2014.01) | |
| *H04N 19/82* | (2014.01) | |

(56) References Cited

U.S. PATENT DOCUMENTS

| | | | | |
|---|---|---|---|---|
| 2021/0021823 A1* | 1/2021 | Na | | G06N 3/08 |
| 2021/0160522 A1* | 5/2021 | Lee | | H04N 19/176 |
| 2022/0375602 A1* | 11/2022 | Jaber | | G16H 30/40 |

FOREIGN PATENT DOCUMENTS

| | | |
|---|---|---|
| KR | 10-2020-0040773 A | 4/2020 |
| WO | 2019/009452 A1 | 1/2019 |

OTHER PUBLICATIONS

International Search Report for PCT/KR2022/009818 by Korean Intellectual Property Office dated Oct. 7, 2022.
Kim, Yangwoo et al. "CNN-based In-loop Filtering Using Block Information", 2019 Korean Society of Broadcasting and Media Engineering Fall Conference, pp. 27-29.

* cited by examiner

| BI:5 | BI:5 | BI:4 | BI:5 | BI:6 |
|------|------|------|------|------|
| BI:4 | | | | BI:6 |
| BI:3 | BI:3 | BI:2 | | |
| BI:3 | BI:3 | | | |

| e | e | e | e | e | e | e | e | d | d | d | d | e | e | f | f |
|---|---|---|---|---|---|---|---|---|---|---|---|---|---|---|---|
| e | e | e | e | e | e | e | e | d | d | d | d | e | e | f | f |
| e | e | e | e | e | e | e | e | d | d | d | d | e | e | f | f |
| e | e | e | e | e | e | e | e | d | d | d | d | e | e | f | f |
| d | d | d | d | d | d | d | d | d | d | d | d | e | e | f | f |
| d | d | d | d | d | d | d | d | d | d | d | d | e | e | f | f |
| d | d | d | d | d | d | d | d | d | d | d | d | e | e | f | f |
| d | d | d | d | d | d | d | d | d | d | d | d | e | e | f | f |
| c | c | c | c | c | c | c | c | b | b | b | b | b | b | b | b |
| c | c | c | c | c | c | c | c | b | b | b | b | b | b | b | b |
| c | c | c | c | c | c | c | c | b | b | b | b | b | b | b | b |
| c | c | c | c | c | c | c | c | b | b | b | b | b | b | b | b |
| c | c | c | c | c | c | c | c | b | b | b | b | b | b | b | b |
| c | c | c | c | c | c | c | c | b | b | b | b | b | b | b | b |
| c | c | c | c | c | c | c | c | b | b | b | b | b | b | b | b |
| c | c | c | c | c | c | c | c | b | b | b | b | b | b | b | b |

FIG. 16

IMAGE ENCODING/DECODING METHOD USING NEURAL NETWORK-BASED IN-LOOP FILTER, DEVICE, AND RECORDING MEDIUM STORING BITSTREAM

CROSS-REFERENCE TO RELATED APPLICATIONS

This application is a National Phase Entry Application of PCT Application No. PCT/KR2022/009818, filed on Jul. 7, 2022, which claims priority to Korean Patent Application No. 10-2021-0092720, filed on Jul. 15, 2021, in Korean Intellectual Property Office, the entire contents of which are hereby incorporated by reference in its entirety.

TECHNICAL FIELD

The present disclosure relates to an image encoding/decoding method and apparatus, and more specifically, to an image encoding/decoding method and apparatus using a neural network-based in-loop filter, and a recording medium storing a bitstream generated by the image encoding method/decoding apparatus of the present disclosure.

BACKGROUND ART

As the demand for high-resolution, high-quality image rapidly increases, the amount of image data and frame rate are increasing. An increase in the amount of image data and frame rate results in an increase in data transmission cost and storage cost. In addition, the data processing amount of an image encoder/decoder increases, thereby increasing complexity.

Accordingly, there is a need for high-efficient image compression technology for effectively transmitting, storing and reproducing image data.

DISCLOSURE

Technical Problem

An object of the present disclosure is to provide an image encoding/decoding method and apparatus with improved encoding/decoding efficiency.

An object of the present disclosure is to provide an image encoding/decoding method and apparatus for performing neural network-based in-loop filtering.

An object of the present disclosure is to provide an image encoding/decoding method and apparatus for performing in-loop filtering using block information of an input image.

An object of the present disclosure is to provide a recording medium storing a bitstream generated by an image encoding method or apparatus.

Technical Solution

An image decoding method according to an aspect of the present disclosure may comprise obtaining a first image feature from an input image, obtaining a block information feature of the input image from block information of the input image, obtaining a second image feature by removing noise and distortion of the first image feature based on the block information feature, and reconstructing the input image based on the second image feature. The block information may comprise at least one of a block boundary map indicating a block partition structure of the input image or a block distribution map indicating encoding information of the input image.

An image encoding method according to another aspect of the present disclosure may comprise obtaining a first image feature from an input image, obtaining a block information feature of the input image from block information of the input image, obtaining a second image feature by removing noise and distortion of the first image feature based on the block information feature, and reconstructing the input image based on the second image feature. The block information may comprise at least one of a block boundary map indicating a block partition structure of the input image or a block distribution map indicating encoding information of the input image.

A computer-readable recording medium according to another aspect of the present disclosure may store a bitstream generated by an image encoding method or image decoding method of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus for performing neural network-based in-loop filtering.

According to the present disclosure, it is possible to provide an image encoding/decoding method and apparatus for performing in-loop filtering using block information of an input image.

According to the present disclosure, it is possible to provide a recording medium storing a bitstream generated by an image encoding method or apparatus.

DESCRIPTION OF DRAWINGS

FIG. 1 is a diagram schematically showing an image encoding apparatus to which an embodiment of the present disclosure is applicable.

FIG. 3 is a view illustrating an image partition structure.

FIGS. 9 and 10 are diagrams showing an example of a block boundary map constructed from the example of FIG. 8.

FIG. 11 is a diagram showing an example of a block distribution map constructed from the example of FIG. 8.

FIG. 16 is a diagram showing the structure of an in-loop filter model according to an embodiment of the present disclosure.

MODE FOR INVENTION

Figure 2:
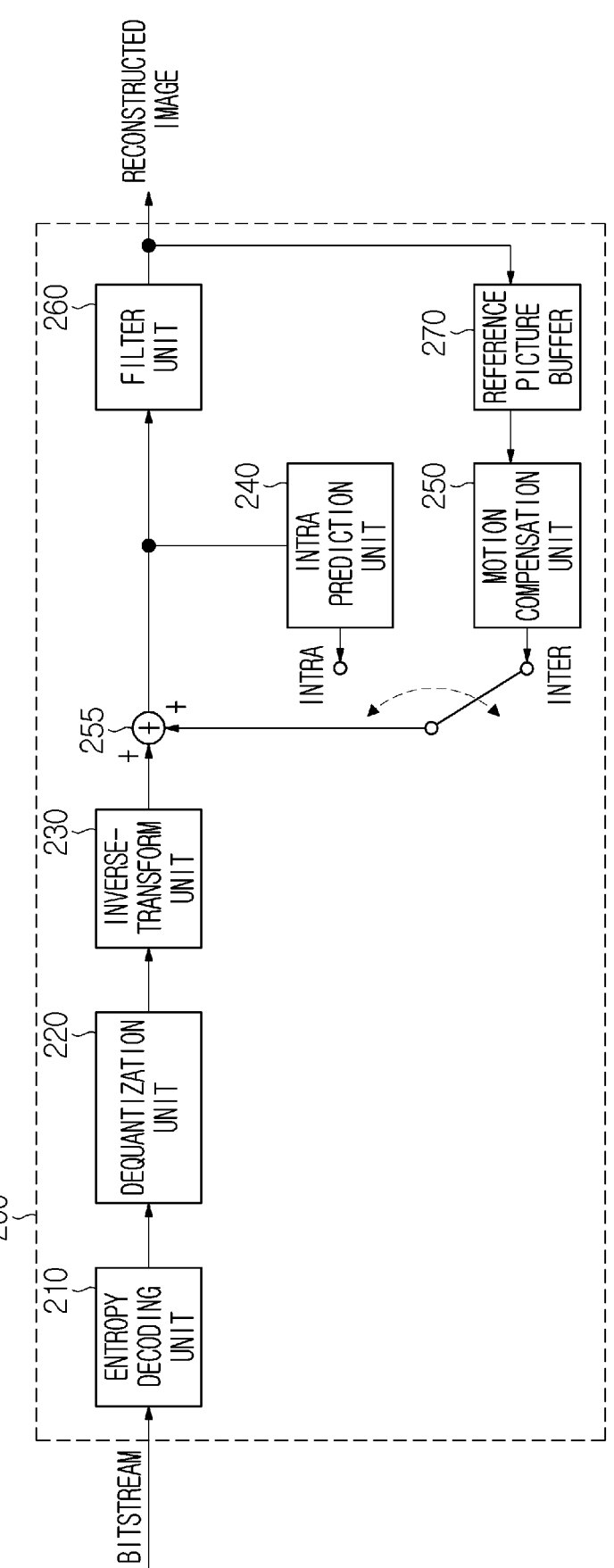
FIG. 2 is a diagram schematically showing an image decoding apparatus to which an embodiment of the present disclosure is applicable.

Hereinafter, embodiments of the present disclosure will be described in detail with reference to the accompanying drawings. The same reference numerals will be used for the same components in the drawings, and repeated descriptions of the same components will be omitted.

In the present disclosure, an image may refer to a single picture constituting a video, and may also represent a video itself. For example, "encoding and/or decoding of an image" may mean "encoding and/or decoding of one of images constituting a video," and may mean "encoding and/or decoding of a video."

In the present disclosure, the terms "moving image" and "video" may be used with the same meaning and may be used interchangeably.

In the present disclosure, a target image may be an encoding target image that is a target of encoding and/or a decoding target image that is a target of decoding. Also, the target image may be an input image input to an encoding apparatus or an input image input to an image decoding apparatus. Here, the target image may have the same meaning as a current image.

In the present disclosure, the terms "image," "picture," "frame," and "screen" may be used with the same meaning and may be used interchangeably.

In the present disclosure, a target block may be an encoding target block that is the target of encoding and/or a decoding target block that is the target of decoding. Additionally, the target block may be a current block that is currently the target of encoding and/or decoding. For example, the terms "target block" and "current block" may have the same meaning and may be used interchangeably.

In the present disclosure, the terms "block" and "unit" may have the same meaning and may be used interchangeably. Alternatively, "block" may refer to a specific unit.

In the present disclosure, the terms "region" and "segment" may be used interchangeably.

In the present disclosure, a specific signal may be a signal representing a specific block. For example, an original signal may be a signal representing a target block. A prediction signal may be a signal representing a prediction block. A residual signal may be a signal representing a residual block.

In embodiments, specific information, data, flag, index, element, attribute, etc. may each have a specific value. For example, a value "0" of information, data, flag, index and element, attribute, etc. may represent logical false or a first predefined value. At this time, the value "0", false, logical false, and the first predefined value may be used interchangeably. A value "1" of information, data, flag, index and element, attribute, etc. may represent logical true or a second predefined value. That is, the value "1", true, logical true and the second predefined value may be used interchangeably.

When a variable such as i or j is used to represent a row, column, or index, the value of i may be an integer equal to or greater than 0 or equal to or greater than 1. That is, in embodiments, rows, columns, indices, etc. may be counted from 0 or may be counted from 1.

Hereinafter, terms used in the present disclosure will be described.

DESCRIPTION OF TERMS

Encoder: refers to an apparatus performing encoding. In other words, it may mean an image encoding apparatus.

Decoder: refers to an apparatus performing decoding. In other words, it may mean an image decoding apparatus.

Block: is an M×N array of samples. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encoding block, a prediction block, a residual block, or a transform block.

Sample: is a basic unit constituting a block. It may be expressed as a value from 0 to $2^{B_d}-1$ according to a bit depth ($B_d$). In the present invention, the sample may have the same meaning as a pixel. That is, a sample, a pel, a pixel may have the same meaning.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predefined process for each unit may be performed. A single unit may be partitioned into lower units that have sizes smaller than the size of the unit. Depending on functions, the unit may mean a block, a macroblock, a coding tree unit, a coding tree block, a coding unit, a coding block, a prediction unit, a prediction block, a residual unit, a residual block, a transform unit, a transform block, etc. In addition, in order to distinguish a unit from a block, the unit may include a luma component block, a chroma component block associated with the luma component block, and a syntax element of each block. The unit may have various sizes and forms, and particularly, the form of the unit may include a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, an encoding and decoding order of a unit, etc.

Coding Tree Unit: is configured with a single coding tree block of a luma component Y, and two coding tree blocks of chroma components Cb and Cr. In addition, it may mean including the blocks and a syntax element of each block. Each coding tree unit may be partitioned by using at least one of a quad-tree partitioning method, a binary tree partitioning method or ternary-tree partitioning method to configure a lower unit such as coding unit, prediction unit, transform unit, etc. It may be used as a term for designating a sample block that becomes a processing unit when encoding/decoding an image, such as partitioning of an input image. Here, the quad-tree may mean a quaternary-tree.

When the size of the coding block is within a predetermined range, the division is possible using only quad-tree partitioning. Here, the predetermined range may be defined as at least one of a maximum size or a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum transform block, the division is possible only using quad-tree partitioning. Herein, the block to be divided may be at least one of a coding block or a transform block. In this case, information indicating the division of the coding block (for example, split_flag) may be a flag indicating whether or not to perform the quad-tree partitioning. When the size of the coding block falls within a predetermined range, only the binary-tree or ternary-tree partition may be possible. In this case, the above description of the quad-tree partition may be applied to binary-tree partition or ternary-tree partition in the same manner.

Coding Tree Block: may be used as a term for designating any one of a Y coding tree block, Cb coding tree block, and Cr coding tree block.

Neighboring Block: may mean a block adjacent to a current block. The block adjacent to the current block may mean a block that comes into contact with a boundary of the current block, or a block positioned within a predetermined distance from the current block. The neighboring block may mean a block adjacent to a vertex of the current block. Herein, the block adjacent to the vertex of the current block may mean a block vertically adjacent to a neighboring block that is horizontally adjacent to the current block, or a block horizontally adjacent to a neighboring block that is vertically adjacent to the current block. The neighboring block may refer to a reconstructed neighboring block.

Reconstructed Neighboring block: may mean a neighboring block adjacent to a current block and which has been already spatially/temporally encoded or decoded. Herein, the reconstructed neighboring block may mean a reconstructed neighboring unit. A reconstructed spatial neighboring block may be a block within a current picture and which has been already reconstructed through encoding or decoding or both. A reconstructed temporal neighboring block is a reconstructed block at a position corresponding to the current block of the current picture within a reference image, or a neighboring block thereof.

Unit Depth: may mean a partitioned degree of a unit. In a tree structure, the highest node (Root Node) may correspond to the first unit which is not partitioned. The highest node may be referred to as a root node. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. The root node may have a shallowest depth and the leaf node may be a deepest depth. In addition, when a unit is expressed as a tree structure, a level in which a unit is present may mean a unit depth.

Bitstream: may mean a bitstream including encoding image information.

Parameter Set: corresponds to header information among structures within a bitstream. At least one of a video parameter set, a sequence parameter set, a picture parameter set, or an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included in one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, or a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter prediction, intra prediction, inter compensation, intra compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list: may refer to a list including one or more reference pictures used for inter prediction or motion compensation. There are several types of usable reference picture lists, including LC (List combined), L0 (List 0), L1 (List 1), L2 (List 2), L3 (List 3), and one or more reference pictures may be used for inter prediction.

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, or a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding a residual signal, such as transform, inverse-transform, quantization, dequantization or transform coefficient. A single transform unit may be partitioned into a plurality of lower-level transform units having a smaller size. Here, transform/inverse-transform may comprise at least one of primary transform/inverse-transform or secondary transform/inverse-transform.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding or dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix predefined in an encoder or a decoder.

Non-default Matrix: may mean a quantization matrix that is not predefined in an encoder or a decoder but is signaled by a user.

Statistic Value: a statistic value for at least one of a variable, an encoding parameter, a constant value, etc. which have a computable specific value may be at least one of an average value, a weighted average value, a weighted sum value, the minimum value, the maximum value, the most frequent value, a median value, an interpolated value of the corresponding specific values.

Figure 1:
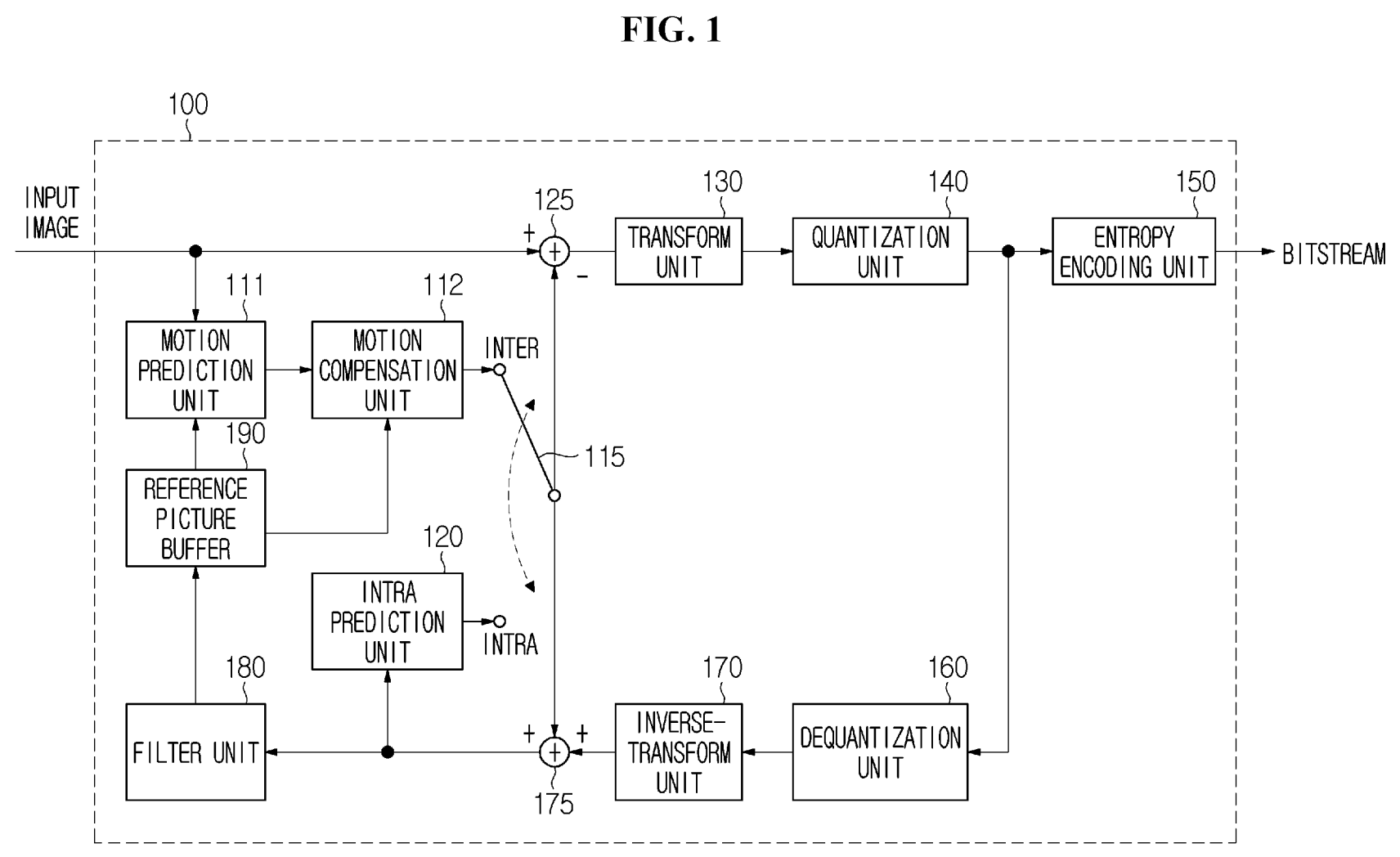

FIG. 1 is a diagram schematically showing an image encoding apparatus to which an embodiment of the present disclosure is applicable.

Referring to FIG. 1, the image encoding apparatus 100 may include a motion prediction unit 111, a motion compensation unit 112, an intra prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The image encoding apparatus 100 may encode an input image in an intra mode or an inter mode or both. In addition, the image encoding apparatus 100 may generate a bitstream including encoded information through encoding of the input image, and output the generated bitstream. The generated bitstream may be stored in a computer readable recording medium, or may be streamed through a wired/wireless transmission medium. When an intra mode is used as a prediction mode, the switch 115 may be switched to an intra mode. Alternatively, when an inter mode is used as a prediction mode, the switch 115 may be switched to an inter mode. Herein, the intra mode may mean an intra prediction mode, and the inter mode may mean an inter prediction mode. The image encoding apparatus 100 may generate a prediction block for an input block of the input image. In addition, the image encoding apparatus 100 may encode a residual block using a residual of the input block and the prediction block after the prediction block being generated. The input image may be referred to as a current image that is a current encoding target. The input block may be referred to as a current block that is current encoding target, or as an encoding target block.

When a prediction mode is an intra mode, the intra prediction unit 120 may use a sample of a block that has been already encoded/decoded around a current block as a reference sample. The intra prediction unit 120 may perform spatial prediction for the current block by using a reference sample, or generate prediction samples of the input block through spatial prediction. Herein, the intra prediction may mean intra prediction.

When a prediction mode is an inter mode, the motion prediction unit 111 may retrieve a region that best matches with an input block from a reference image when performing motion prediction, and derive a motion vector by using the retrieved region. In this case, a search region may be used as the region. The reference image may be stored in the reference picture buffer 190. Here, when encoding/decoding of the reference image is performed, it may be stored in reference picture buffer 190.

The motion compensation unit 112 may generate a prediction block from the current block by performing motion compensation using a motion vector. Herein, inter prediction may mean inter prediction or motion compensation.

When the value of the motion vector is not an integer, the motion prediction unit 111 and the motion compensation unit 112 may generate the prediction block by applying an interpolation filter to a partial region of the reference picture. In order to perform inter prediction or motion compensation, based on the coding unit, it may be determined which of a skip mode, a merge mode, an advanced motion vector prediction (AMVP) mode, or a current picture referring mode is used for motion prediction and motion compensation of a prediction unit included in the corresponding coding unit, and inter prediction or motion compensation may be performed depending on each mode.

The subtractor 125 may generate a residual block by using a difference between an input block and a prediction block. The residual block may be referred to as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform on the residual block, and output the generated transform coefficient. Herein, the transform coefficient may be a coefficient value generated by performing transform on the residual block. When a transform skip mode is applied, the transform unit 130 may skip transform on the residual block.

A quantized level may be generated by applying quantization to the transform coefficient or to the residual signal. Hereinafter, the quantized level may be also referred to as a transform coefficient in embodiments.

The quantization unit 140 may generate a quantized level by quantizing the transform coefficient or the residual signal according to a quantization parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated in an encoding process, and output the generated bitstream. The entropy encoding unit 150 may perform entropy encoding on sample information of an image and information for decoding of an image. For example, the information for decoding of the image may include a syntax element.

When entropy encoding is applied, symbols are represented by assigning a smaller number of bits to a symbol having a high generation probability and assigning a larger number of bits to a symbol having a low generation probability, and thus, the size of bit stream for symbols to be encoded may be decreased. The entropy encoding unit 150 may use an encoding method, such as exponential Golomb, context-adaptive variable length coding (CAVLC), context-adaptive binary arithmetic coding (CABAC), etc., for entropy encoding. For example, the entropy encoding unit 150 may perform entropy encoding by using a variable length coding/code (VLC) table. In addition, the entropy encoding unit 150 may derive a binarization method of a target symbol and a probability model of a target symbol/bin, and perform arithmetic coding by using the derived binarization method, the probability model and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) encoded in an encoder and signaled to a decoder, such as syntax element, and information derived in the encoding or decoding process, and may mean information required when encoding or decoding an image. For example, at least one value or a combination form of a unit/block size, a unit/block depth, unit/block partition information, unit/block shape, unit/block partition structure, whether to partition in a quad tree form, whether to partition of a binary tree form, a partition direction of a binary tree form (horizontal direction or vertical direction), a partition form in a binary tree form (symmetric partition or asymmetric partition), whether to partition in a ternary tree form, a partition direction (horizontal or vertical direction) of a ternary tree form, a partition form in a ternary tree shape (symmetric partition or asymmetric partition), whether to partition in a multi-type tree form, a partition direction of a multi-type tree form (horizontal or vertical direction), a partition form in a multi-type tree form (symmetric partition or asymmetric partition), and a partition tree in a multi-type tree form (binary tree or ternary tree), a prediction mode (intra prediction or inter prediction), a luma intra prediction mode/direction, a chroma intra prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tab, a prediction block filter coefficient, a prediction block boundary filtering method, a prediction block filter tab, a prediction block boundary filter coefficient, an intra prediction mode, an inter prediction mode, motion information, a motion vector, a motion vector difference, a reference picture index, an inter prediction direction, an inter prediction indicator, a prediction list utilization flag, a reference picture list, a reference picture, a motion vector prediction index, a motion vector prediction candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary transform is used, information of whether or not a secondary transform is used, a primary transform index, a secondary transform index, information of whether or not a residual signal is present, a coded block pattern, a coded block flag (CBF), a quantization parameter, a residual quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, the number of times of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstructed sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the image encoding apparatus 100 performs encoding through inter prediction, an encoded current image may be used as a reference image for another image that is processed afterwards. Accordingly, the image encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization or inverse-transform is performed, and may mean a reconstructed residual block.

A reconstructed block may pass through the filter unit 180. The filter unit 180 may apply at least one of a deblocking filter, a sample adaptive offset (SAO), or an adaptive loop filter (ALF) to a reconstructed sample, a reconstructed block or a reconstructed image. The filter unit 180 may be referred to as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate for an encoding error using a sample adaptive offset, a proper offset value may be added to a sample value. The sample adaptive offset may correct an offset of a deblocked image with an original image on a sample basis. A method of partitioning samples of an image into a predetermined number of regions, determining a region to which an offset is applied, and applying the offset to the determined region, or a method of applying an offset in consideration of edge information of each sample may be used.

The adaptive loop filter may perform filtering based on a value obtained by comparing the reconstructed image and the original image. Samples included in an image may be partitioned into predetermined groups, a filter to be applied to each group may be determined, and differential filtering may be performed for each group. Information of whether or not to apply the adaptive loop filter may be signaled by coding units (CUs), and a form and coefficient of the adaptive loop filter to be applied to each block may vary.

The reconstructed block or the reconstructed image having passed through the filter unit 180 may be stored in the reference picture buffer 190. The reconstructed block which has passed through the filter unit 180 may be a part of a reference image. That is, a reference image is a reconstructed image composed of reconstructed blocks which has passed through the filter unit 180. The stored reference image may be used later in inter prediction or motion compensation.

FIG. 2 is a diagram schematically showing an image decoding apparatus to which an embodiment of the present disclosure is applicable.

Referring to FIG. 2, the image decoding apparatus 200 may include an entropy decoding unit 210, a dequantization unit 220, an inverse-transform unit 230, an intra prediction unit 240, a motion compensation unit 250, an adder 225, a filter unit 260, and a reference picture buffer 270.

The image decoding apparatus 200 may receive a bitstream output from the image encoding apparatus 100. The image decoding apparatus 200 may receive a bitstream stored in a computer readable recording medium, or may receive a bitstream that is streamed through a wired/wireless transmission medium. The image decoding apparatus 200 may decode the bitstream in an intra mode or an inter mode. In addition, the image decoding apparatus 200 may generate a reconstructed image or a decoded image generated through decoding, and output the reconstructed image or decoded image.

When a prediction mode used for decoding is an intra mode, a switch may be switched to an intra mode. Alternatively, when a prediction mode used for decoding is an inter mode, a switch may be switched to an inter mode.

The image decoding apparatus 200 may obtain a reconstructed residual block by decoding the input bitstream, and generate a prediction block. When the reconstructed residual block and the prediction block are obtained, the image decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-dimensional vector form coefficient into a two-dimensional block form through a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra prediction unit 240 may generate a prediction block by performing, on the current block, spatial prediction that uses a sample value of a block which has been already decoded around a decoding target block.

When an inter mode is used, the motion compensation unit 250 may generate a prediction block by performing, on the current block, motion compensation that uses a motion vector and a reference image stored in the reference picture buffer 270. When the value of the motion vector is not an integer, the motion compensation unit 250 may generate a prediction block by applying an interpolation filter to a partial region in the reference image. To perform motion compensation, based on the coding unit, it may be determined which of a skip mode, a merge mode, an advanced motion vector prediction (AMVP) mode, or a current picture referring mode is used for motion prediction and motion compensation of a prediction unit included in the corresponding coding unit, and motion compensation may be performed depending on each mode.

The adder 225 may generate a reconstructed block by adding the reconstructed residual block with the prediction block. The filter unit 260 may apply at least one of a deblocking filter, a sample adaptive offset, or an adaptive loop filter to the reconstructed block or reconstructed image. The filter unit 260 may output the reconstructed image. The reconstructed block or reconstructed image may be stored in the reference picture buffer 270 and used for inter prediction. The reconstructed block which has passed through the filter unit 260 may be a part of a reference image. That is, a reference image is a reconstructed image composed of reconstructed blocks which has passed through the filter unit 260. The stored reference image may be used later in inter prediction or motion compensation.

Figure 3:
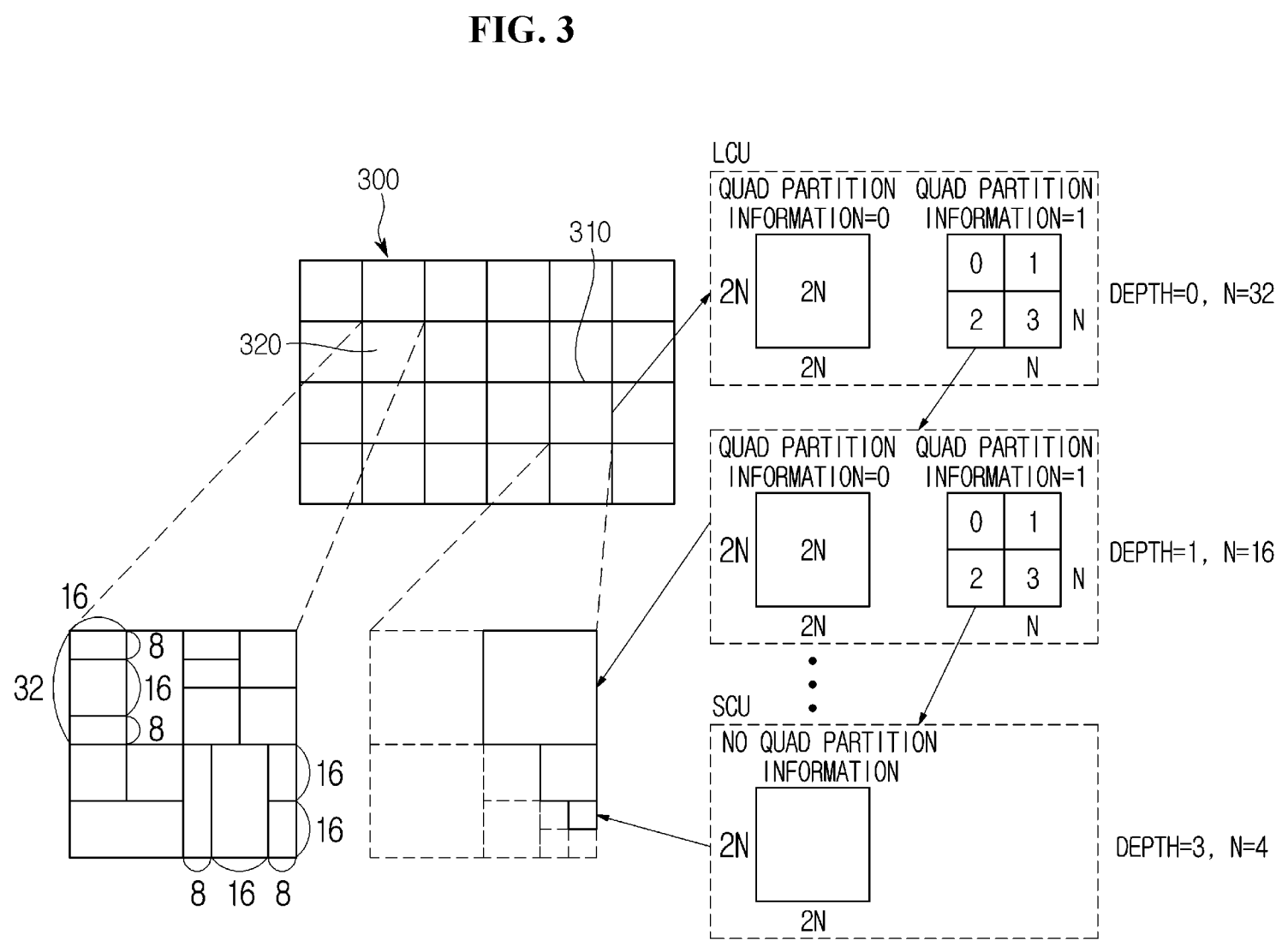

FIG. 3 is a view illustrating an image partition structure.

FIG. 3 shows an example of partitioning one unit into a plurality of lower units.

In order to efficiently partition an image, in encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block corresponding to the unit. In block partition information, information on a unit depth may be included. Depth information may represent the number of times or a degree or both in which a unit is partitioned. A single unit may be hierarchically partitioned into a plurality of lower level units with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents the number of times and/or degree in which the unit is partitioned. Therefore, partitioning information of a lower-level unit may comprise information on a size of the lower unit.

A partition structure may mean a distribution of a coding unit (CU) within a CTU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half a width and a height of the CU before partitioning, or may respectively have sizes smaller than a width and a height before partitioning according to a number of times of partitioning. The CU may be recursively partitioned into a plurality of CUs. By the recursive partitioning, at least one of a width or a height of a CU after partitioning may decrease compared to at least one of a width or a height of a CU before partitioning. Partitioning of the CU may be recursively performed up to a predefined depth or predefined size. For example, a depth of a CTU may be 0, and a depth of a smallest coding unit (SCU) may be a predefined maximum depth. Herein, the CTU may be a coding unit having a maximum coding unit size, and the SCU may be a coding unit having a minimum coding unit size as described above. Partitioning is started from the CTU 310, a CU depth increases by 1 as a width or a height or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increases by 1.

In addition, information about whether or not the CU is partitioned may be represented through partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, a CTU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a width and a height of the four partitioned coding units may be a half size compared to a width and height of the CU before being partitioned. In one embodiment, when a coding unit having a 32×32 size is partitioned into four coding units, each of the four partitioned coding units may have a 16×16 size. When a single coding unit is partitioned into four coding units, it can be said that the coding unit may be partitioned in a quad tree form (quad-thee partition).

For example, when one coding unit is partitioned into two sub-coding units, the width or height of each of the two sub-coding units may be half the width or height of the coding unit before partitioning. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is partitioned in a binary-tree form (binary-tree partition).

For example, when one coding unit is partitioned into three sub-coding units, the width or height of the coding unit before partitioning may be partitioned into three sub-coding units with a ratio of 1:2:1. For example, when a coding unit having a size of 16×32 is horizontally partitioned into three sub-coding units, the three sub-coding units may have sizes of 16×8, 16×16, and 16×8 respectively, starting from the top. For example, when a coding unit having a size of 32×32 is vertically partitioned into three sub-coding units, the three sub-coding units may have sizes of 8×32, 16×32, and 8×32, respectively from the left. When one coding unit is partitioned into three sub-coding units, it can be said that the coding unit is partitioned in a ternary-tree form (ternary-tree partition).

In FIG. 3, a coding tree unit (CTU) 320 is an example of a CTU to which a quad-tree partition structure, a binary-tree partition structure, and a ternary-tree partition structure are all applied.

As described above, in order to partition the CTU, at least one of a quad-tree partition, a binary-tree partition, or a ternary-tree partition may be applied. Each partitioning may be applied based on predetermined priority. For example, the quad-tree partition may be preferentially applied to the CTU. A coding unit that cannot be partitioned any longer in a quad-tree form may correspond to a leaf node of a quad tree. A coding unit corresponding to a leaf node of a quad tree may become a root node of a binary and/or ternary tree. That is, a coding unit corresponding to a leaf node of a quad tree may be partitioned in the binary-tree form or the ternary-tree form, or may not be further partitioned. Therefore, by preventing a coding block generated by partitioning a coding unit corresponding to a leaf node of a quad tree in a binary-tree form or a ternary-tree form from being partitioned in a quad-tree form, block partitioning and/or signaling of partition information can be effectively performed.

Partitioning of a coding unit corresponding to a node of a quad tree may be signaled using quad partition information. The quad partition information having a first value (e.g., "1") may indicate that a current coding unit is partitioned in the quad-tree form. The quad partition information having a second value (e.g., "0") may indicate that a current coding unit is not partitioned in the quad-tree form. The quad partition information may be a flag having a predetermined length (e.g., one bit).

There may not be a priority between the binary-tree partition and the ternary-tree partition. That is, a coding unit corresponding to a leaf node of a quad tree may be partitioned in the binary-tree form or the ternary-tree form. In addition, a coding unit generated by the binary-tree partition or the ternary-tree partition may be partitioned again in the binary-tree form or the ternary-tree partition, or may not be further partitioned.

Partitioning when there is no priority between the binary-tree partition and the ternary-tree partition is referred to as a multi-type tree structure. A coding unit corresponding to a leaf node of a quad tree may become a root node of a multi-type tree. Whether to partition a coding unit which corresponds to each node of a multi-type tree may be signaled using at least one of information about whether to partition in the multi-type tree form, partition direction information, or partition tree information. For partitioning of a coding unit corresponding to each node of the multi-type tree, information about whether to partition in the multi-type tree form, the partition direction, and the partition tree information may be sequentially signaled.

The information about whether to partition in the multi-type tree form having a first value (e.g., "1") may indicate that a current coding unit is partitioned in the multi-type tree form. The information about whether to partition in the multi-type tree form having a second value (e.g., "0") may indicate that a current coding unit is not partitioned in the multi-type tree form.

When a coding unit corresponding to a node of a multi-type tree is partitioned in the multi-type tree form, the coding unit may further include partition direction information. The partition direction information may indicate the partition direction of the multi-type tree partition. The partition direction information having a first value (e.g., "1") may indicate that a corresponding coding unit is vertically partitioned. The partition direction information having a second value (e.g., "0") may indicate that a corresponding coding unit is horizontally partitioned.

When a coding unit corresponding to each node of a multi-type tree is partitioned in the multi-type tree form, the corresponding coding unit may further include partition tree information. The partition tree information may indicate a tree used for the multi-type tree partition. The partition tree information having a first value (e.g., "1") may indicate that a corresponding coding unit is partitioned in the binary-tree form. The partition tree information having a second value (e.g., "0") may indicate that a corresponding coding unit is partitioned in the ternary-tree form.

The information about whether to partition, the partition tree information, and the partition direction information may each be a flag having a predetermined length (e.g., one bit).

At least one of the quad-tree partition information, information about whether to perform the multi-type tree partition, the partition direction information, or the partition tree information may be entropy encoded/decoded. For the entropy-encoding/decoding of the information, information on a neighboring coding unit adjacent to the current coding unit may be used. For example, there is a high probability that the partition form (whether to partition, the partition tree, and/or the partition direction) of a left coding unit and/or an upper coding unit is similar to that of the current coding unit. Therefore, context information for entropy encoding/decoding of the information on the current coding unit may be derived based on the information on the neighboring coding units. The information on the neighboring coding units may include at least one of quad partition information, information whether to perform the multi-type tree partition, partition direction information, or partition tree information.

As another example, among binary-tree partition and ternary-tree partition, binary-tree partition may be preferentially performed. That is, the binary-tree partition is first applied, and a coding unit corresponding to a leaf node of a binary tree may be set as a root node for a ternary tree. In this case, neither quad-tree partition-nor binary-tree partition may not be performed on the coding unit corresponding to a node of a ternary tree.

A coding unit that cannot be further partitioned by a quad-tree partition, a binary-tree partition, and/or a ternary-tree partition becomes a basic unit for coding, prediction and/or transform. That is, the coding unit cannot be further partitioned for prediction and/or transform. Therefore, the partition structure for partitioning a coding unit into prediction units and/or transform units and the partition information may not be present in a bitstream.

However, when the size of a coding unit which is a partition unit is larger than the size of a maximum transform block, the corresponding coding unit may be recursively partitioned until the size of the coding unit is equal to or smaller than the size of the maximum transform block. For example, when the size of a coding unit is 64×64 and the size of a maximum transform block is 32×32, the coding unit may be partitioned into four 32×32 blocks for transform. For example, when the size of a coding unit is 32×64 and the size of a maximum transform block is 32×32, the coding unit may be partitioned into two 32×32 blocks for the transform. In this case, partitioning of the coding unit for transform is not signaled separately, and may be determined through comparison between the width or height of the coding unit and the width or height of the maximum transform block. For example, when the width of the coding unit is larger than the width of the maximum transform block, the coding unit may be vertically bisected. For example, when the height of the coding unit is larger than the height of the maximum transform block, the coding unit may be horizontally bisected.

Information on the maximum and/or minimum size of the coding unit and information on the maximum and/or minimum size of the transform block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transform block may be determined to be 64×64. For example, the minimum size of the transform block may be determined to be 4×4.

Information on the minimum size (minimum size of a quad tree) of a coding unit corresponding to a leaf node of a quad tree and/or information on the maximum depth (maximum depth of a multi-type tree) from a root node to a leaf node of the multi-type tree may be signaled or determined at an upper level of the coding unit. For example, the upper level may be a sequence level, a picture level, a slice level, a tile group level, a tile level, or the like. The information on the minimum size of the quad tree and/or the information on the maximum depth of the multi-type tree may be signaled or determined for each of an intra slice and an inter slice.

Difference information between the size of a CTU and the maximum size of a transform block may be signaled or determined at an upper level of the coding unit. For example, the upper level may be a sequence level, a picture level, a slice level, a tile group level, a tile level, or the like. Information on the maximum size of the coding unit (maximum size of binary tree) corresponding to each node of a binary tree may be determined based on the size of the coding tree unit and the difference information. The maximum size of the coding unit (maximum size of ternary tree) corresponding to each node of a ternary tree may have a value varying depending on the type of the slice. For example, for an intra slice, the maximum size of a ternary tree may be 32×32. For example, for an inter slice, the maximum size of a ternary tree may be 128×128. For example, the minimum size of the coding unit (minimum size of binary tree) corresponding to each node of a binary tree and/or the minimum size of the coding unit (minimum size of ternary tree) corresponding to each node of a ternary tree may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, information about whether to perform a multi-type tree partition, partition tree information and/or partition direction information may be present or may not be present in a bitstream.

For example, when the size of the coding unit is not larger than the minimum size of a quad tree, the coding unit does not contain quad partition information. Thus, the quad partition information may be inferred to be a second value.

For example, when the sizes (width and height) of a coding unit corresponding to a node of a multi-type tree are larger than the maximum sizes (width and height) of a binary tree and/or the maximum sizes (width and height) of a ternary tree, the coding unit may not be partitioned in the binary-tree form or ternary-tree form. Accordingly, the information about whether to perform the multi-type tree partition may not be signaled but may be inferred to be a second value.

Alternatively, when the sizes (width and height) of a coding unit corresponding to a node of a multi-type tree are the same as the maximum sizes (width and height) of a binary tree and/or the sizes (width and height) of the coding unit are two times as large as the maximum sizes (width and height) of a ternary tree, the coding unit may not be further partitioned in the binary-tree form and/or ternary-tree form. Accordingly, the information about whether to perform the multi-type tree partition may not be signaled but be inferred to be a second value. This is because when the coding unit is partitioned in the binary-tree form and/or the ternary-tree form, a coding unit smaller than the minimum size of a binary tree and/or the minimum size of a ternary tree is generated.

Alternatively, the binary-tree partition or the ternary-tree partition may be limited on the basis of the size of a virtual pipeline data unit (hereinafter, a pipeline buffer size). For example, when the coding unit is partitioned into sub-coding units which do not fit the pipeline buffer size by the binary-tree partition or the ternary-tree partition, the corresponding binary-tree partition or ternary-tree partition may be limited. The pipeline buffer size may be the size of the maximum transform block (e.g., 64×64). For example, when the pipeline buffer size is 64×64, the following partition may be limited.

N×M (N and/or M is 128) Ternary-tree partition for coding unit

128×N (N<=64) Binary-tree partition in horizontal direction for coding unit

N×128 (N<=64) Binary-tree partition in vertical direction for coding unit

Alternatively, when the depth of a coding unit corresponding to a node of a multi-type tree is equal to the maximum depth of the multi-type tree, the coding unit may not be partitioned in the binary-tree form and/or the ternary-tree form. Accordingly, the information about whether to perform the multi-type tree partition may not be signaled but may be inferred to be a second value.

Alternatively, only when at least one of vertical direction binary-tree partition, horizontal direction binary-tree partition, vertical direction ternary-tree partition, and horizontal direction ternary-tree partition is possible for a coding unit corresponding to a node of a multi-type tree, the information about whether to perform the multi-type tree partition may be signaled. Otherwise, the coding unit may not be partitioned in the binary-tree form and/or the ternary-free form. Accordingly, the information about whether to perform the multi-type tree partition may not be signaled but may be deduced from a second value.

Alternatively, only when both of the vertical direction binary-tree partition and the horizontal direction binary-tree partition or both of the vertical direction ternary-tree partition and the horizontal direction ternary-tree partition are possible for a coding unit corresponding to a node of a multi-type tree, the partition direction information may be signaled. Otherwise, the partition direction information may not be signaled but may be inferred to be a value indicating partitionable directions.

Alternatively, only when both of the vertical direction binary-tree partition and the vertical direction ternary-tree partition or both of the horizontal direction binary-tree partition and the horizontal direction ternary-tree partition are possible for a coding tree corresponding to a node of a multi-type tree, the partition tree information may be signaled. Otherwise, the partition tree information may not be signaled but be inferred to be a value indicating a partitionable tree.

Figure 4:
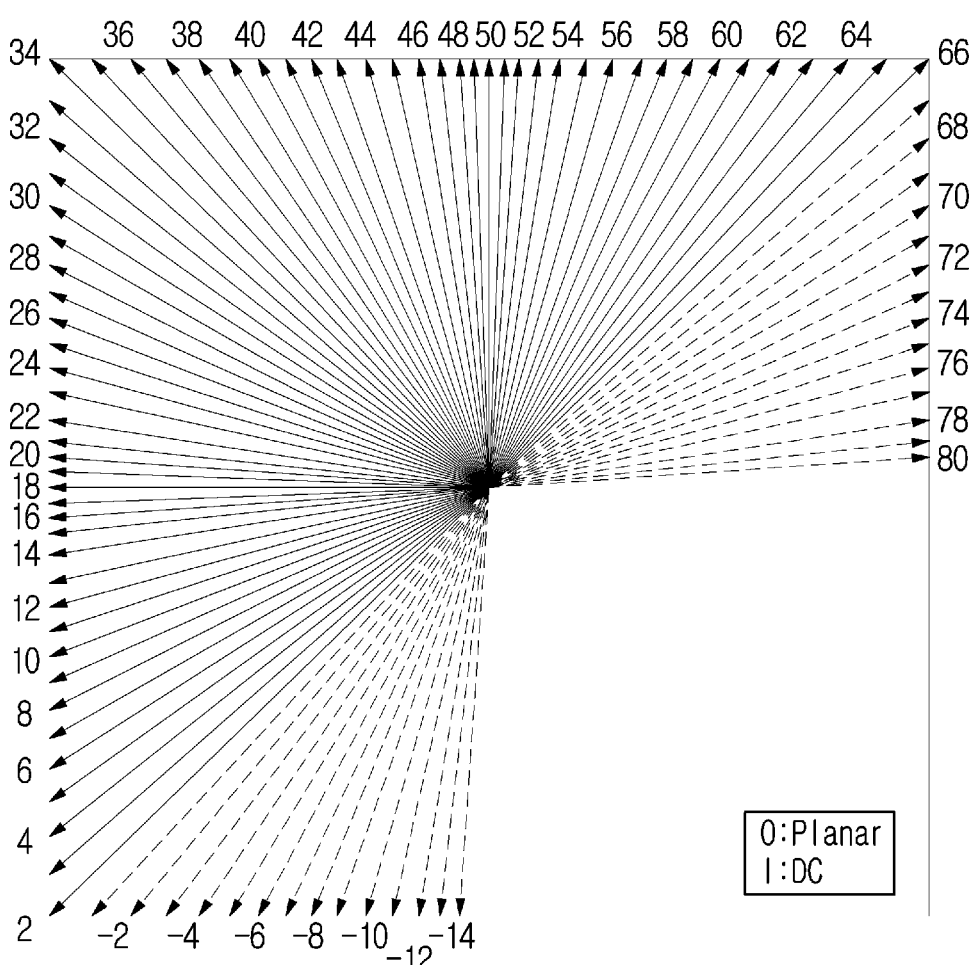
FIG. 4 is a diagram illustrating an intra prediction process.

FIG. 4 is a diagram illustrating an intra prediction process.

FIG. 4 shows a prediction direction in an intra prediction mode. Specifically, in FIG. 4, a solid direction may represent a prediction direction in an extended directional intra prediction mode, and a dotted direction may represent a prediction direction in a wide angle mode applied only to a non-square block.

Intra prediction may be performed using a reference sample of a neighboring block of the current block. A neighboring block may be a reconstructed neighboring block. For example, intra prediction may be performed using an encoding parameter or a value of a reference sample included in a reconstructed neighboring block.

A prediction block may mean a block generated by performing intra prediction. A prediction block may correspond to at least one of CU, PU or TU. A unit of a prediction block may have a size of one of CU, PU or TU. A prediction block may be a square block having a size of 2×2, 4×4, 16×16, 32×32, 64×64 etc. or may be a rectangular block having a size of 2×8, 4×8, 2×16, 4×16, 8×16 etc.

Intra prediction may be performed according to the intra prediction mode for the current block. The number of intra prediction modes which the current block may have may be a predefined fixed value and may be a value determined differently according to an attribute of a prediction block. For example, an attribute of a prediction block may comprise a size of a prediction block and a shape of a prediction block, etc.

The number of intra prediction modes may be fixed to N regardless of a block size. Alternatively, the number of intra prediction modes may be 3, 5, 9, 17, 34, 35, 36, 65, 67, 95 etc. Alternatively, the number of intra prediction modes may vary according to a block size or a color component type or both. For example, the number of intra prediction modes may vary according to whether the color component is a luma signal or a chroma signal. For example, as a block size becomes large, the number of intra prediction modes may increase. Alternatively, the number of intra prediction modes of a luma component block may be larger than the number of intra prediction modes of a chroma component block.

An intra prediction mode may be a non-angular mode or an angular mode. The non-angular mode may be a DC mode or a planar mode, and the angular mode may be a prediction mode having a specific direction or angle. The intra prediction mode may be expressed by at least one of a mode number, a mode value, a mode numeral, a mode angle, or mode direction. The number of intra prediction modes may be M, which is equal to or larger than 1, including the non-angular and the angular mode. In order to intra-predict a current block, a step of determining whether or not samples included in a reconstructed neighboring block may be used as reference samples of the current block may be performed. When a sample that is not usable as a reference sample of the current block is present, a value obtained by duplicating or performing interpolation on at least one sample value of samples included in the reconstructed neighboring block or both may be used as replacement for the sample that is not usable as the reference sample and may be used as the reference sample of the current block.

To capture an arbitrary edge direction presented in a natural video, as shown in FIG. 4, an intra prediction mode may include 2 non-angular modes and 93 angular modes. The non-angular modes may include a planar mode and a DC mode. Additionally, the angular modes may include intra modes consisting of #2 to #80 and #−1 to #−14, as indicated by the arrows in FIG. 4. The planar mode may be denoted as INTRA_PLANAR, and the DC mode may be denoted as INTRA_DC. Additionally, the angular modes may be indicated as INTRA_ANGULAR−14 to INTRA_ANGULAR−1, and INTRA_ANGULAR2 to INTRA_ANGULAR80.

The image encoding apparatus may encode intra prediction mode/type information indicating an intra prediction mode applied to a current block and signal it through a bitstream. In one example, the intra prediction mode/type information includes flag information (e.g., intra_luma_mpm_flag and/or intra_chroma_mpm_flag) indicating whether a most probable mode (MPM) or a remaining mode is applied to the current block. When the MPM is applied to the current block, the intra prediction mode/type information may further include index information (e.g., intra_luma_mpm_idx and/or intra_chroma_mpm_idx) indicating one of intra prediction mode candidates (MPM candidates). On the other hand, when the MPM is not applied to the current block, the intra prediction mode/type information may further include remaining mode information (e.g., intra_luma_mpm_remainder and/or intra_chroma_mpm_remainder) indicating one of the remaining intra prediction modes excluding the intra prediction mode candidates (MPM candidates). The image decoding apparatus may determine the intra prediction mode of the current block based on the intra prediction mode/type information received through the bitstream.

The intra prediction mode/type information may be encoded/decoded using various coding methods described in the present disclosure. For example, the intra prediction mode/type information may be encoded/decoded through entropy coding (e.g., CABAC, CAVLC) based on truncated (rice) binary code.

Figure 5:
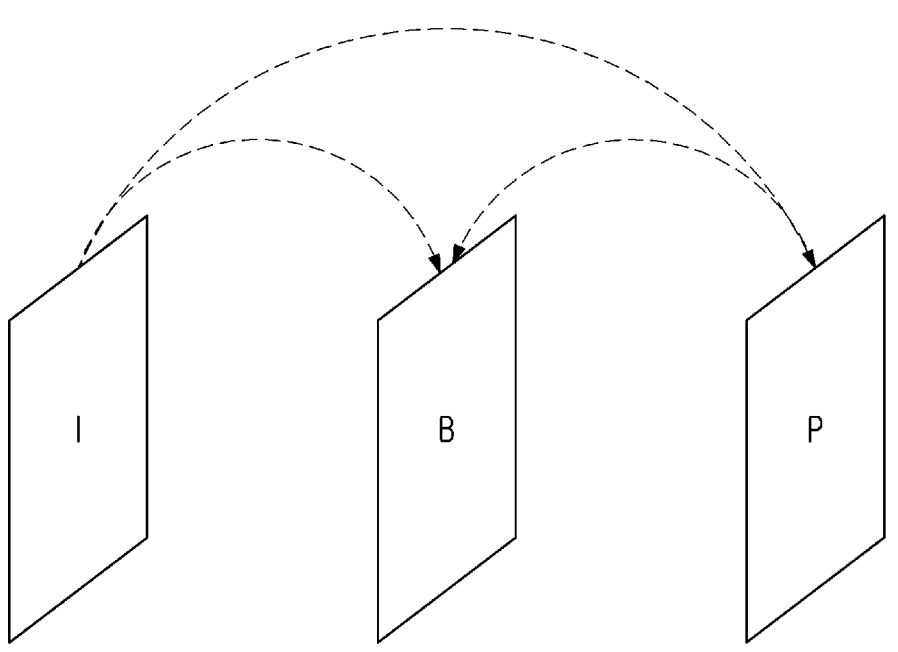
FIG. 5 is a diagram illustrating an embodiment of an inter prediction process.

FIG. 5 is a diagram illustrating an embodiment of an inter prediction process.

In FIG. 5, a rectangle may represent a picture. Each arrow represents a prediction direction. Pictures may be categorized into intra pictures (I pictures), predictive pictures (P pictures), and Bi-predictive pictures (B pictures) according to the encoding type thereof.

Referring to FIG. 5, the I picture may be encoded/decoded through intra prediction without requiring inter prediction. The P picture may be encoded/decoded through inter prediction using a reference picture that is present in one direction (i.e., forward direction or backward direction). The B picture may be encoded/decoded through inter prediction using reference pictures that are preset in both directions (i.e., forward direction and backward direction). Additionally, the B picture may be encoded/decoded through inter prediction using reference images present in both directions or inter prediction using a reference image present in one of the forward and backward directions. Here, both directions may be a forward direction and a backward direction. When the inter prediction is used, the image encoding apparatus may perform inter prediction or motion compensation and the image decoding apparatus may perform the corresponding motion compensation.

The inter prediction or motion compensation may be performed using a reference picture and motion information.

Motion information of a current block may be derived in an inter prediction process by each of the image encoding apparatus and the image decoding apparatus. The motion information may be derived by using motion information of a reconstructed neighboring block, motion information of a collocated block (also referred to as a col block or a collocated block), and/or a block adjacent to the collocated block. The collocated block may mean a block corresponding to the spatial position of the current block, within a previously reconstructed collocated picture (also referred to as a col picture or a collocated picture). The collocated picture may be one picture among one or more reference pictures included in a reference picture list.

The derivation method of the motion information may vary depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combined prediction mode, affine mode, and the like. Herein, the merge mode may be referred to as a motion merge mode.

For example, when the AMVP is applied as the prediction mode, at least one of a motion vector of a reconstructed neighboring block, a motion vector of a collocated block, a motion vector of a block adjacent to a collocated block, or a (0, 0) motion vector may be determined as a motion vector candidate, thereby generating a motion vector candidate list.

The motion vector candidate may be derived by using the generated motion vector candidate list. The motion information of the current block may be determined based on the derived motion vector candidate. The motion vector of the collocated block or the motion vector of the block adjacent to the collocated block may be referred to as a temporal motion vector candidate, and the motion vector of a reconstructed neighboring block may be referred to as a spatial motion vector candidate.

The image encoding apparatus may calculate a motion vector difference (MVD) between the motion vector of the current block and the motion vector candidate and may perform entropy encoding on the motion vector difference (MVD). In addition, the image encoding apparatus may perform entropy encoding on a motion vector candidate index and generate a bitstream. The motion vector candidate index may indicate an optimum motion vector candidate selected from among the motion vector candidates included in the motion vector candidate list. The image decoding apparatus may perform entropy decoding on the motion vector candidate index from the bitstream and may select a motion vector candidate of a decoding target block from among the motion vector candidates included in the motion vector candidate list using the entropy-decoded motion vector candidate index. In addition, the image decoding apparatus may derive the motion vector of the decoding target block through the sum of the entropy-decoded MVD and the motion vector candidate.

Meanwhile, the image encoding apparatus may perform entropy-coding on resolution information of the calculated MVD. The image decoding apparatus may adjust the resolution of the entropy-decoded MVD using the MVD resolution information.

Meanwhile, the image encoding apparatus may calculate a motion vector difference (MVD) between the motion vector of the current block and the motion vector candidate on the basis of an affine model and perform entropy-coding on the MVD. The image decoding apparatus may derive a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded and then signaled through a bitstream from the image encoding apparatus to the image decoding apparatus. The image decoding apparatus may generate a prediction block of the decoding target block based on the derived motion vector and the reference picture index information.

Another example of the method of deriving the motion information may include a merge mode. The merge mode may mean a method of merging motion of a plurality of blocks. The merge mode may mean a mode in which motion information of the current block is derived from the motion information of the neighboring block. When the merge mode is applied, the merge candidate list may be generated using the motion information of the reconstructed neighboring block and/or the motion information of the collocated block. The motion information may include at least one of 1) a motion vector, 2) a reference picture index, or 3) an inter prediction indicator. The prediction indicator may indicate one direction (L0 prediction or L1 prediction) or both directions.

The merge candidate list may represent a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information present in the merge candidate list, motion information (history-based merge candidate) of the block that is encoded/decoded before the current block, or a zero merge candidate.

The image encoding apparatus may generate a bitstream by performing entropy encoding on at least one of a merge flag or a merge index and may signal the bitstream to the image decoding apparatus. The merge flag may be information indicating whether or not to perform the merge mode for each block, and the merge index may be information about which block to merge with among the neighboring blocks adjacent to the current block. For example, the neighboring blocks of the current block may include a left neighboring block, an upper neighboring block, or a temporal neighboring block of the current block.

Meanwhile, the image encoding apparatus may perform entropy-coding on the correction information for correcting the motion vector among the motion information of the merge candidate and signal the same to the image decoding apparatus. The image decoding apparatus may correct the motion vector of the merge candidate selected by the merge index based on the correction information. Here, the correction information may include at least one of information on whether or not to perform the correction, correction direction information, or correction size information. As described above, the prediction mode that corrects the motion vector of the merge candidate based on the signaled correction information may be referred to as a merge mode with a motion vector difference.

The skip mode may be a mode in which the motion information of the neighboring block is applied to the current block as it is. When the skip mode is applied, the image encoding apparatus may perform entropy encoding on information about which block's motion information will be used as the motion information of the current block and signal the same to the image decoding apparatus through a bitstream. The image encoding apparatus may not signal a syntax element regarding at least one of the motion vector difference information, the encoding block flag, or the transform coefficient level (quantized level) to the image decoding apparatus.

The subblock merge mode may mean a mode in which the motion information is derived in units of sub-blocks of a coding block (CU). When the subblock merge mode is applied, a subblock merge candidate list may be generated using motion information (sub-block based temporal merge candidate) of the collocated sub-block of the current sub-block in the reference image and/or an affine control point motion vector merge candidate.

The triangle partition mode may mean a mode in which motion information is derived by partitioning the current block in a diagonal direction, each prediction sample is derived using each of the derived motion information, and the prediction sample of the current block is derived through a weighted sum of the derived prediction samples.

The inter-intra combined prediction mode may mean a mode in which a prediction sample of the current block is derived through a weighted sum of a prediction sample generated by inter prediction and a prediction sample generated by intra prediction.

The image decoding apparatus may correct the derived motion information by itself. The image decoding apparatus may search a predefined region based on the reference block indicated by the derived motion information and derive the motion information with the minimum SAD as the corrected motion information.

The image decoding apparatus may compensate for a prediction sample derived via inter prediction using an optical flow.

Figure 6:
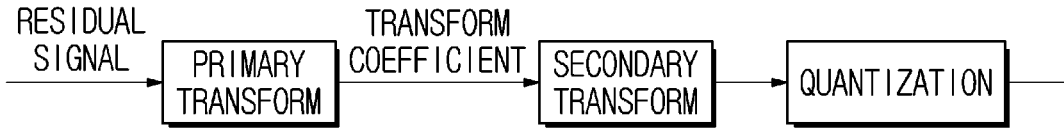
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level. The residual signal may be generated as a difference between an original block and a prediction block (i.e., an intra prediction block or an inter prediction block). The prediction block may be a block generated through intra prediction or inter prediction.

The transform may be at least one of a primary transform or a secondary transform. A transform coefficient may be generated by performing primary transform on the residual signal and a secondary transform coefficient may be generated by performing secondary transform on the transform coefficient.

The primary transform may be performed using at least one of a plurality of predefined transform methods. For example, examples of the plurality of predefined transform methods include discrete cosine transform (DCT), discrete sine transform (DST), or Karhunen-Loève transform (KLT). Secondary transform may be performed on the transform coefficient generated through the primary transform. The transform methods used for the primary transform and/or the secondary transform may be determined according to at least one of coding parameters of the current block and/or neighboring blocks. Alternatively, transform information indicating the transform method may be signaled. The DCT-based transform may include, for example, DCT-2, DCT-8, and the like. The DST-based transform may include, for example, DST-7.

A quantized level may be generated by performing quantization on the residual signal or a result of performing the primary transform and/or the secondary transform. The quantized level may be scanned according to at least one of a diagonal up-right scan, a vertical scan, or a horizontal scan, depending on at least one of an intra prediction mode or a block size/shape. For example, by scanning the coefficients of the block in a diagonal up-right scan, it may be changed to a one-dimensional vector form. Depending on the size of the transform block and/or the intra prediction mode, a vertical scan that scans the two-dimensional block-type coefficients in the column direction or a horizontal scan that scans the two-dimensional block-type coefficients in the row direction may be used instead of the diagonal up-right scan. The scanned quantized level may be entropy encoded and included in the bitstream. The scanned quantized level may be entropy-encoded and included in a bitstream.

A decoder may entropy-decode the bitstream and generate a quantized level. The quantized level may be arranged in a two-dimensional block form through inverse scanning. For the inverse scanning, at least one of a diagonal up-right scan, a vertical scan, or a horizontal scan may be used.

Dequantization may be performed on the quantized level, secondary inverse transform may be performed depending on whether to perform secondary inverse transform, and primary inverse transform may be performed on a result of performing secondary inverse transform depending on whether to perform primary inverse transform, thereby generating a reconstructed residual signal.

Inverse mapping in a dynamic range may be performed on a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived based on the mapping function. In-loop filtering, reference picture storage, and motion compensation are performed in an inverse mapped region, and a prediction block generated through inter prediction is converted into a mapped region via mapping using the mapping function, and then used to generate the reconstructed block. However, since the intra prediction is performed in the mapped region, the prediction block generated by the intra prediction may be used to generate the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the chroma block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be converted into the inversely mapped region. Then, chroma component block reconstruction, intra prediction, inter prediction, in-loop filtering, and reference picture storage may be performed in the inversely mapped region.

Information indicating whether the mapping/inverse mapping of the luma component and chroma component is available may be signaled through a sequence parameter set.

The prediction block of the current block may be generated based on a block vector indicating a displacement between the current block and the reference block in the current picture. In this way, a prediction mode in which a prediction block is generated by referring to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, or a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, embodiments of the present disclosure will be described in detail.

As described above, the image encoding/decoding apparatus partitions an input image in CTU units, and partitions each CTU in units of predetermined blocks such as CU (Coding Unit), TU (Transform Unit), and PU (Prediction Unit), thereby finally encoding/decoding the image in block units.

Figures 7, 8:
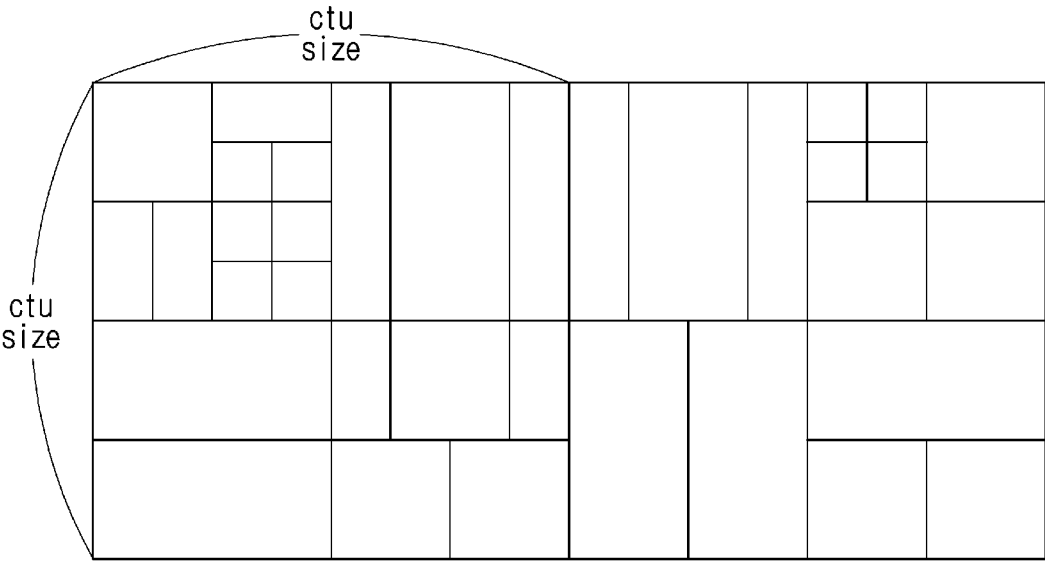
FIG. 7 is a diagram showing an example of partitioning an input image.
FIG. 8 is a diagram showing an example of block information mapped to each lower block in an input image.

FIG. 7 is a diagram showing an example of partitioning an input image.

Referring to FIG. 7, the input image may be partitioned in CTU units of M×N size. Here, M and N may be the same or different from each other. Each CTU may be partitioned into a plurality of lower blocks (or sub-blocks) based on a quad tree, binary tree, or ternary tree (QT/BT/TT) structure. At this time, the lower blocks may have absolute coordinates with respect to the input image and may not invade other blocks.

Each lower block in the input image may be classified using predetermined characteristic values included according to the purpose of the block. The characteristic value may be transmitted from the image encoding apparatus to the image decoding apparatus, or may be derived in block units by the image decoding apparatus. The characteristic value may include, for example, a block depth indicating the degree of partition of the lower block, a prediction mode or a transform mode of the lower block, etc. The lower blocks may be classified in various ways depending on the type of characteristic value. Hereinafter, in the present disclosure, the characteristic value will be referred to as block information (BI).

FIG. 8 is a diagram showing an example of block information mapped to each lower block in an input image.

Referring to FIG. 8, a plurality of lower blocks may be obtained by recursively performing a quad-tree partition and a binary-tree partition on the input image 800. Block information indicating a block depth may be mapped to each lower block in the input image 800. For example, block information (BI) having a value of 2 may be mapped to one lower-right lower block of the input image 800 obtained through a quad-tree partition. Additionally, block information (BI) having a value of 3 may be mapped to each of the four lower-left lower blocks of the input image 800 obtained through a recursive quad-tree partition. Additionally, block information (BI) having a value of 4 may be mapped to one upper-right lower block and one upper-left lower block of the input image 800 obtained through a recursive horizontal binary-tree partition. Additionally, block information (BI) having a value of 5 may be mapped to the two upper-right lower blocks and one upper-left lower block of the input image 800 obtained through a recursive vertical binary-tree partition. Additionally, block information (BI) having a value of 6 may be mapped to the two upper-right lower blocks of the input image 800 obtained through a recursive horizontal binary-tree partition.

From the example of FIG. 8, a block boundary map indicating a block partition structure and a block distribution map (or block characteristic map) indicating block information (BI) may be constructed.

Figures 9, 10:
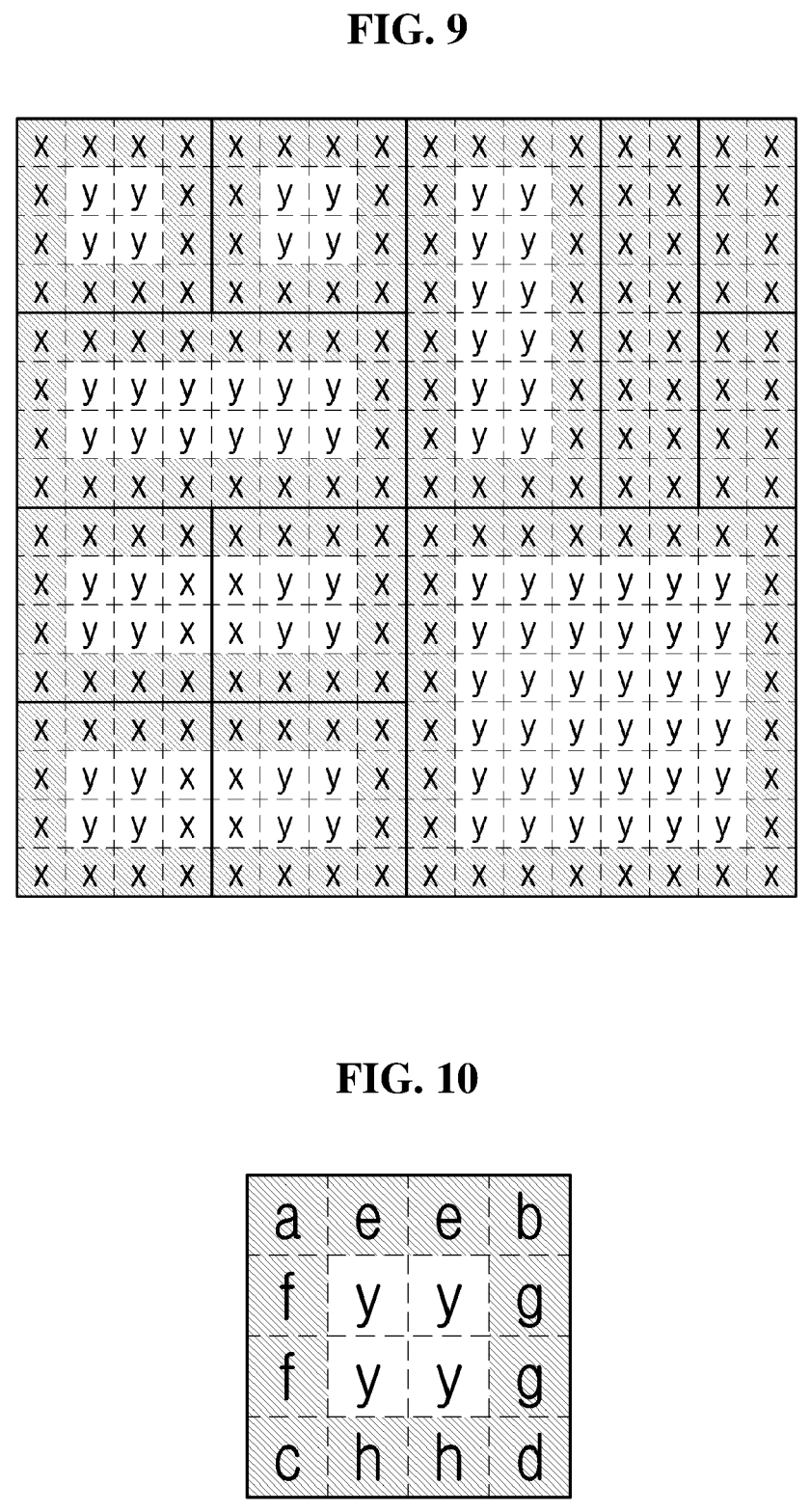

FIGS. 9 and 10 are diagrams showing an example of a block boundary map constructed from the example of FIG. 8.

First, referring to FIG. 9, a predetermined first value x may be mapped to pixels placed at the boundary of each lower block. Additionally, a predetermined second value y may be mapped to pixels placed in regions other than the boundary of each lower block. Here, x may be equal to or greater than 0 and equal to or less than 5, and y may be 0.

In another example, in order to more specifically express the samples placed at the block boundary, the first value x may be subdivided into a plurality of values (e.g., a to h) as shown in FIG. 10 and mapped to each sample. Specifically, referring to FIG. 10, a sample value a may be mapped to a pixel located at an upper left corner of the lower block. Additionally, a sample value b may be mapped to a pixel located at the upper right corner of the lower block. Additionally, a sample value c may be mapped to a pixel located at the lower left corner of the lower block. Additionally, a sample value d may be mapped to a pixel located at the lower right corner of the lower block. Additionally, a sample value e may be mapped to each of the pixels located at the upper boundary excluding each corner of the lower block. Additionally, a sample value f may be mapped to each of the pixels located on the left boundary excluding each corner of the lower block. Additionally, a sample value g may be mapped to each of the pixels located on the right boundary excluding each corner of the lower block. Additionally, a sample value h may be mapped to each of the pixels located at the lower boundary excluding each corner of the lower block.

FIG. 11 is a diagram showing an example of a block distribution map constructed from the example of FIG. 8.

Referring to FIG. 11, a sample value a representing block information of a value of 1 may be mapped to pixels in a lower block with the block information of the value of 1 in the input image. Additionally, a sample value b representing block information of a value of 2 may be mapped to pixels in a lower block with the block information of the value of 2 in the input image. Additionally, a sample value c representing block information of a value of 3 may be mapped to pixels in a lower block with the block information of the value of 3 in the input image. Additionally, a sample value d representing block information of a value of 4 may be mapped to pixels in a lower block with the block information of the value of 4 in the input image. Additionally, a sample value e representing a block information of a value of 5 may be mapped to pixels in a lower block with the block information of the value of 5 in the input image. Additionally, a sample value f representing block information of a value of 6 may be mapped to pixels in a lower block with the block information of the value of 6 in the input image. At this time, the sample values a to f may be different real numbers, or may be normalized values within a range of 0 or more and 1 or less.

Figure 12:
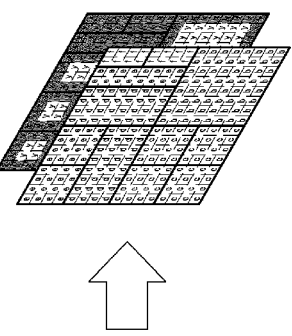
FIG. 12 is a diagram showing an example of grouping a block boundary map and a block distribution map in channel units.
Figure 12:
Figure 12:
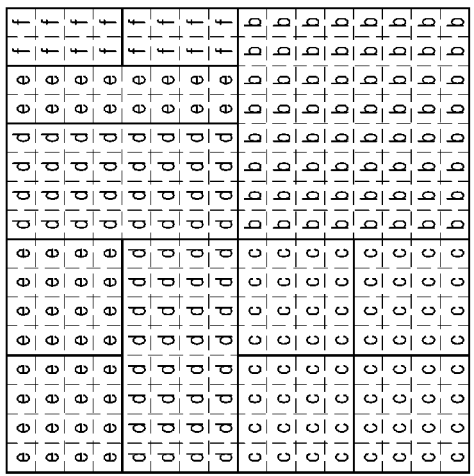

In one embodiment, the block boundary map and block distribution map of the input image may be grouped and reorganized into one block map group. For example, at least one of the block boundary map or the block distribution map may be scaled (i.e., downscaled or upscaled) by a predetermined ratio S based on the upper left position (i.e., (0, 0) position) of the input image, and the scaled block boundary map and block distribution map may be merged on a channel basis and reorganized into one block map group. At this time, when the size of the input image is (B, C, H, W) (where B is a batch size, C is the number of channels, W is the width of the input image, and H is the height of the input image), the size of the block map group may be (B, C', H×S, W×S) (where C' refers to the number of block boundary maps and S refers to a scaling factor). FIG. 12 shows an example of grouping one block boundary map and one block distribution map for an input image on a channel basis and then downscaling them to ½ the size.

In another embodiment, the block boundary map and block distribution map of the input image may be synthesized/reorganized into a single block information map. For example, a single block information map B may be obtained by a weighted sum (e.g., B $[x,y]=\alpha \cdot B_1[x,y]-(1-\alpha) \cdot B_2[x,y]$, $0 \leq \alpha \leq 1$) of each sample value $B_1[x,y]$ of a block boundary map $B_1$ and each sample value $B_2[x,y]$ of a block distribution map $B_2$ corresponding thereto. Hereinafter, for convenience of description, embodiments of the present disclosure will be described focusing on the case where a block map group is reorganized based on a block boundary map and a block distribution map.

The block map group obtained from the input image may be used as additional information in a neural network-based in-loop filtering process for the input image. That is, by executing a neural network using the block map group as input, neural network-based in-loop filtering may be performed on the input image.

Hereinafter, a method of inputting the block map group to the neural network will be described in detail.

Figure 13:
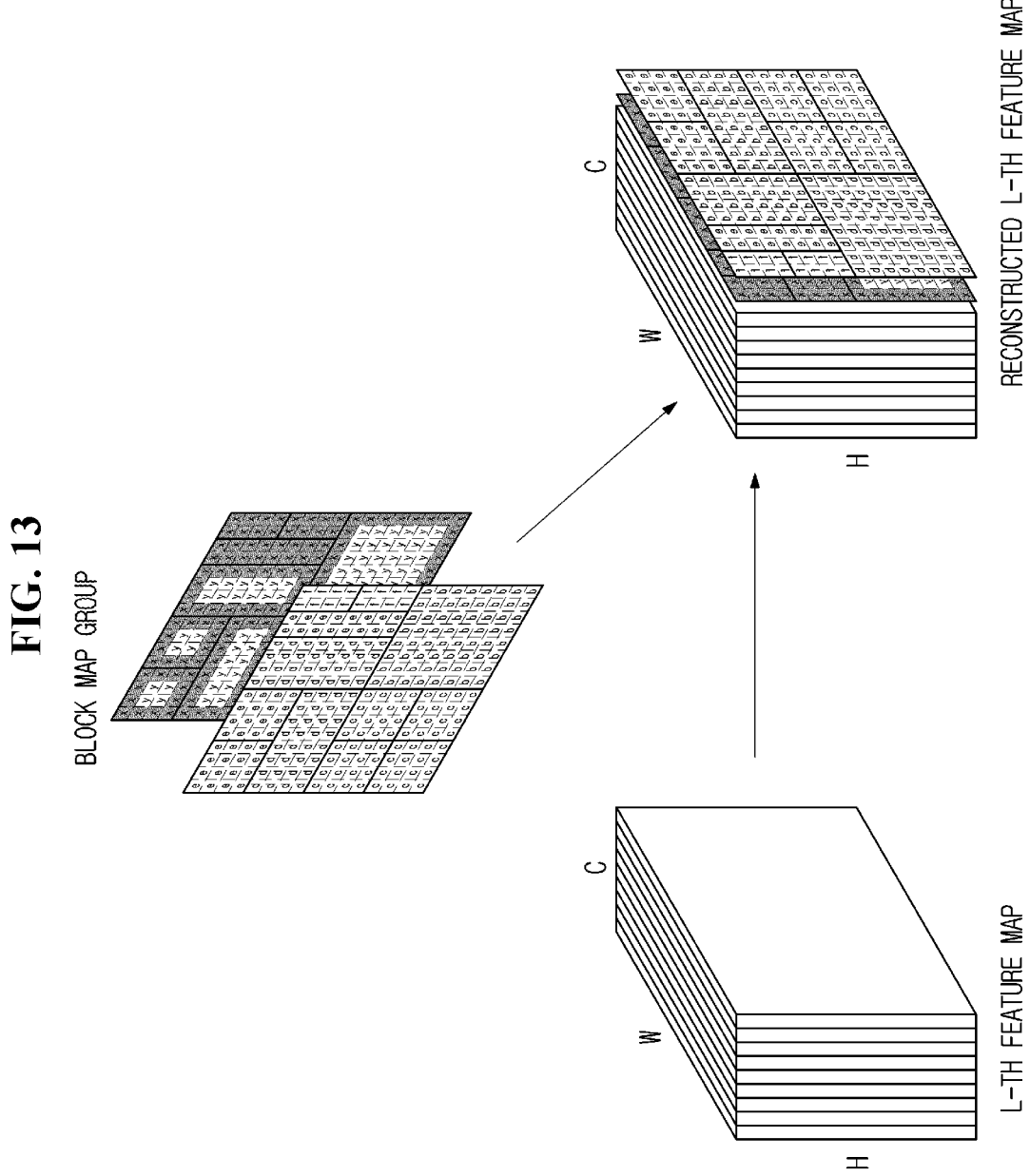
FIGS. 13 to 15 are diagrams for explaining a method of inputting a block map group to a neural network.
Figure 14:
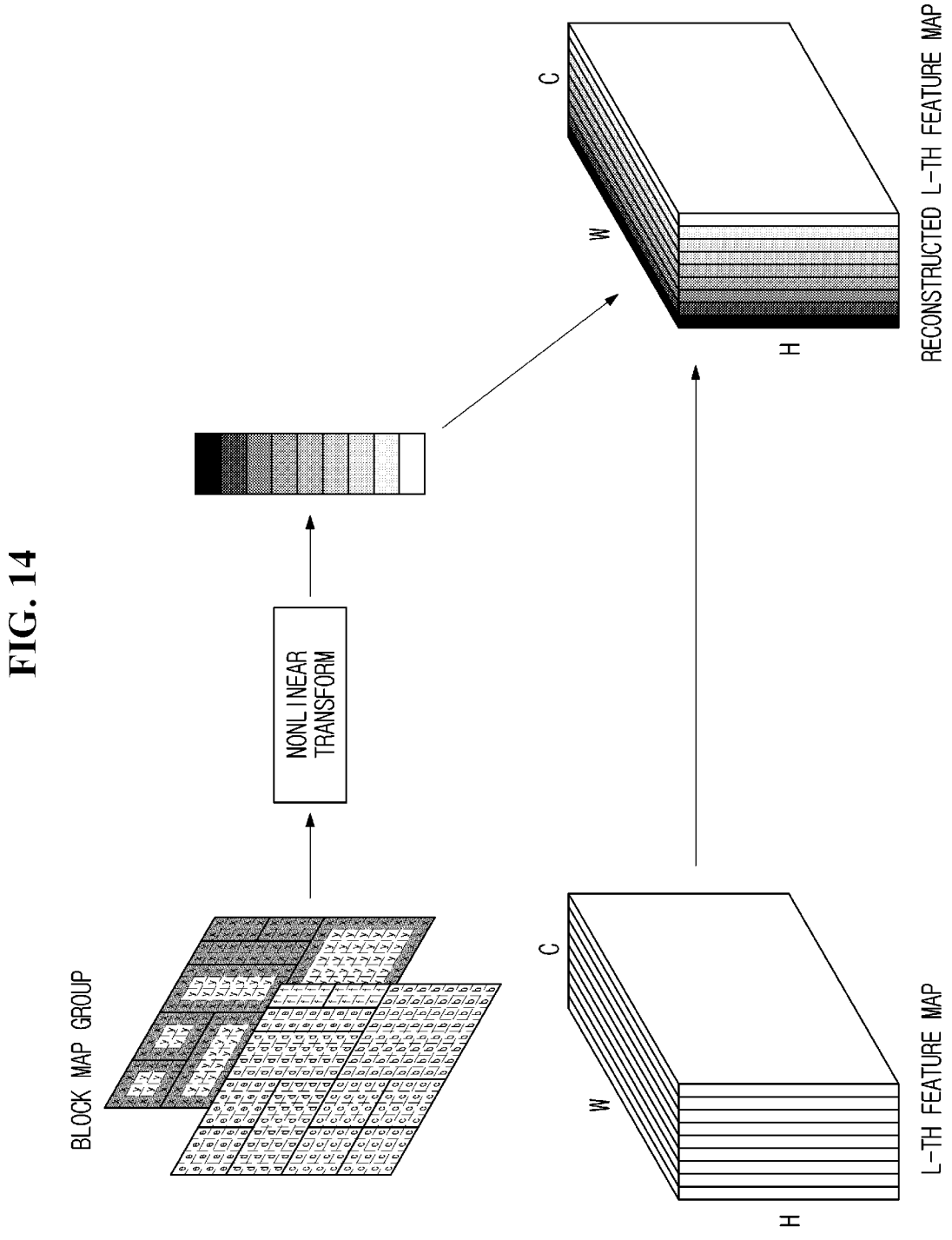
Figure 15:
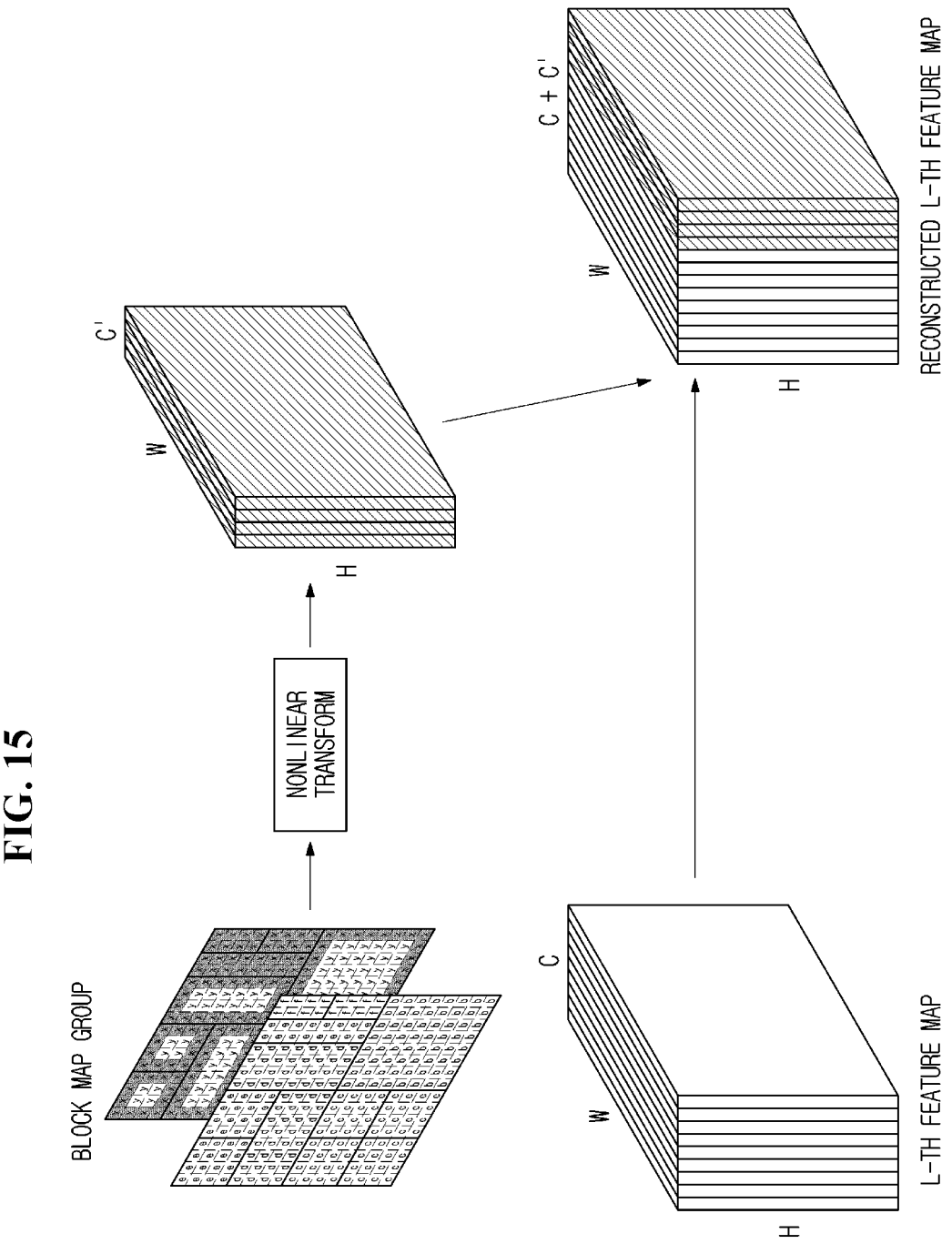

FIGS. 13 to 15 are diagrams for explaining a method of inputting a block map group to a neural network.

First, referring to FIG. 13, a block map group obtained from an input image may be added in channel units to an L-th feature map extracted by executing a neural network, for example, a convolutional neural network (CNN) on the input image. The L-th feature map may mean the output result of the L-th layer of the CNN with N layers (here, $0 \leq L \leq M$), and the input image may be regarded as a 0-th feature map of the CNN model. The CNN may be trained in advance based on a predetermined learning image, block partition information of the learning image, prediction information, and/or transform/quantization information, etc. Additionally, the CNN may be additionally trained based on the in-loop filtering results for the input image.

As the block map group is added to the L-th feature map on a channel basis, the total number of channels of the L-th feature map may increase by the total number of block boundary maps and block distribution maps in the block map group.

Next, referring to FIG. 14, the block map group obtained from the input image may be transformed into a one-dimensional vector and then added to the L-th feature map of the input image in pixel units. For example, the block map group may be transformed into a one-dimensional vector through non-linear transform. At this time, the number of elements of the one-dimensional vector may be equal to the number of channels of the L-th feature map. In addition, the L-th feature map may be reorganized by multiplying the x-th element of the one-dimensional vector by the x-th channel of the L-th feature map in pixel units.

Unlike the case of FIG. 13, as the block map group is added to the L-th feature map in pixel units, the total number of channels of the L-th feature map may remain the same.

Next, referring to FIG. 15, the block map group obtained from the input image may be scaled to a predetermined size and then added to the L-th feature map of the input image in channel units. For example, the block map group may be scaled to size (B, C', H, W) through non-linear transform. At this time, the number C' of channels of the scaled block map group may be equal to the total number of block boundary maps and block distribution maps in the block map group. In addition, by adding the scaled block map group to the L-th feature map, the L-th feature map may be reorganized.

As in the case of FIG. 13, as the scaled block map group is added to the L-th feature map in channel units, the total number of channels of the L-th feature map will increase by the total number of channels of the scaled block map group.

Hereinafter, an in-loop filter model according to an embodiment of the present disclosure will be described in detail.

Figure 16:
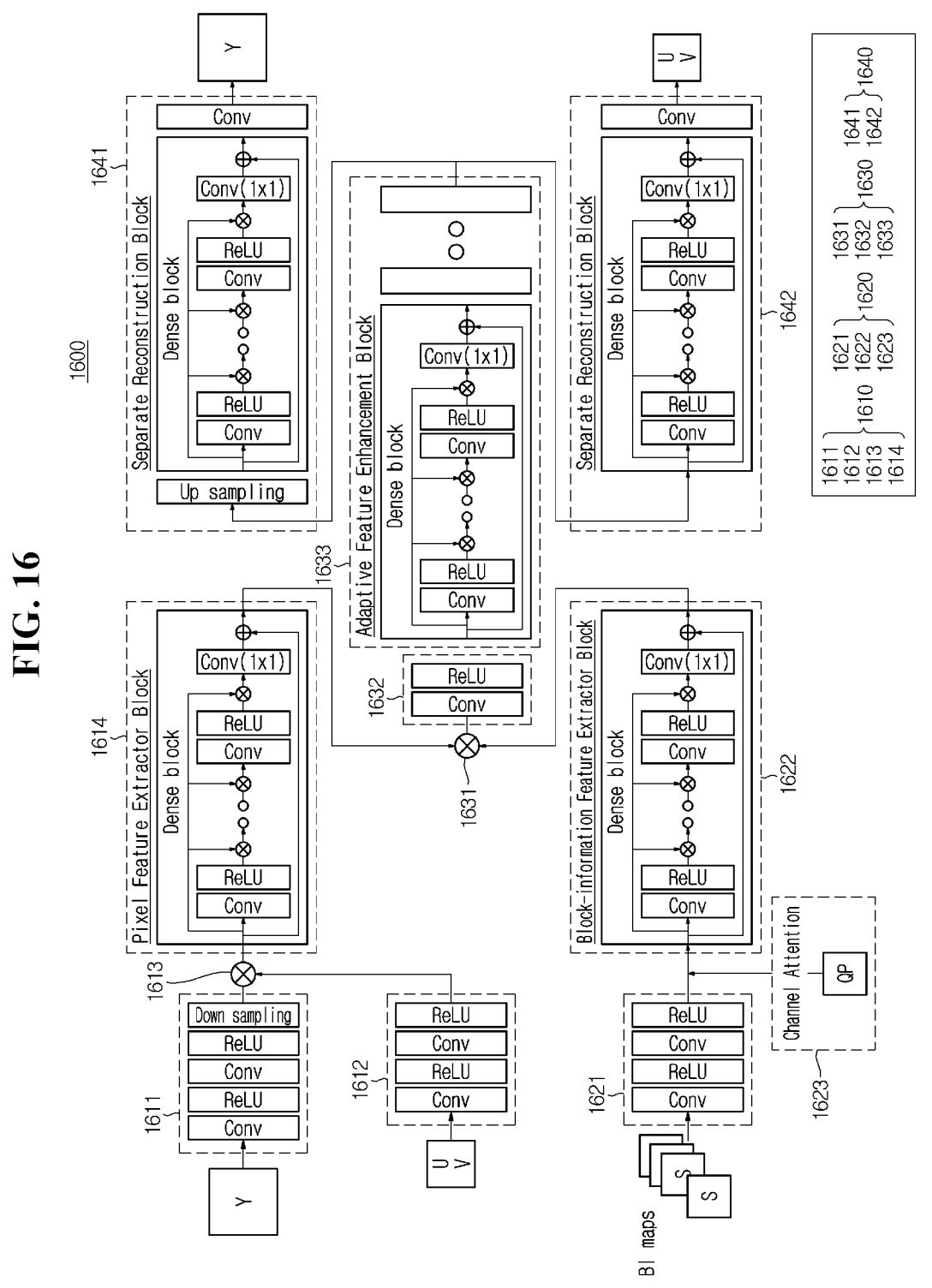

FIG. 16 is a diagram showing the structure of an in-loop filter model according to an embodiment of the present disclosure. The in-loop filter model 1600 of FIG. 16 may be implemented in the image encoding apparatus 100 of FIG. 1 or the image decoding apparatus 200 of FIG. 2. For example, the filter unit 180 in the image encoding apparatus 100 may be implemented as the in-loop filter model 1600 of FIG. 16. Additionally, the filter unit 260 in the image decoding apparatus 200 may be implemented as the in-loop filter model 1600 of FIG. 16.

Referring to FIG. 16, the in-loop filter model 1600 may include an image feature extraction unit 1610, a block information feature extraction unit 1620, a feature enhancement unit 1630, and an image reconstruction unit 1640.

The image feature extraction unit 1610 pre-processes the input image (1611, 1612) and then executes a neural network on the pre-processed input image to extract the feature (or feature map) of the input image (1613, 1614). The neural network may include, for example, a Convolutional Neural Network (CNN), a Recurrent Neural Network (RNN), or a Deep Neural Network (DNN). The neural network may be trained in advance based on a predetermined learning image, block partition information of the learning image, prediction information, and/or transform/quantization information. Additionally, the neural network may be additionally trained based on the in-loop filtering results of the input image.

The image feature extraction unit 1610 may separate the input image by color component and perform a preprocessing operation (1611, 1612). For example, the image feature extraction unit 1610 separates the input image into a luma component Y and chroma components U and V and then performs a first preprocessing operation 1611 on the luma component Y and performs a second preprocessing operation 1612 on the chroma components U and V. The first preprocessing operation 1611 may be performed by applying a convolution operation using a 3×3 filter kernel to the luma component Y and then down-sampling the result of the convolution operation at a predetermined rate. At this time, the number of input channels in the first preprocessing operation 1611 may be 1, and the number of output channels may be 64. Additionally, the second preprocessing operation 1612 may be performed by applying a convolution operation using a 3×3 filter kernel to the chroma components U and V. At this time, the number of input channels in the second preprocessing operation 1612 may be 2, and the number of output channels may be 64.

The image feature extraction unit 1610 concatenates the luma component Y and the chroma components U and V of the preprocessed input image (1613) and then executes a neural network using the concatenation result as input, thereby extracting the feature (or feature map) of the input image (1614). The neural network may have a dense block structure in which a plurality of convolutional layers and a plurality of activation layers are alternately repeated. At this time, the convolution layers may include at least one 1×1 convolution layer disposed at the output end or middle of the neural network. Additionally, the activation layers may use an activation function to provide non-linear characteristics to the output result of a previous layer (i.e., convolution layer). The activation function may include, for example, a Rectified Linear Unit (ReLU) function, a sigmoid function, or a Tanh function.

The block information feature extraction unit 1620 preprocesses the block information S of the input image (1621) and then executes a neural network using the preprocessed block information S as input, thereby extracting the feature (or the feature map) of the block information S (1622).

The block information S includes a predetermined characteristic value contained in each lower block in the input image, such as a block depth indicating the degree of partition of the lower block, a prediction mode or transform mode of the lower block, etc.

In one embodiment, the block information S may include information about intra prediction. For example, the block information S may include an intra prediction mode for the luma component, flag information indicating whether matrix based intra prediction (MIP) is applied, information indicating whether intra prediction based on MRL (multi-reference line) is performed, an intra prediction mode and/or CU depth for the chroma component, etc.

In another embodiment, the block information S may include information about inter prediction. For example, the block information S may include an inter prediction mode, a distance (or POC difference) between a current picture and a reference picture, a motion vector, CFG information, and/or a CU depth.

As described above with reference to FIG. 8, the block information S may be mapped to each lower block in the input image in predetermined units (e.g., pixel units), and from this, the above-described block boundary map and block distribution map described above with reference to FIGS. 9 to 11 may be constructed. The block boundary map and block distribution map may be grouped or reorganized into a single block information map as described above with reference to FIG. 12, and the feature of the block information S may be extracted from the grouped/reorganized block boundary map and block distribution map. Meanwhile, as described above, the neural network includes, for example, CNN, RNN, or DNN, and may be pre-trained based on a predetermined learning image, etc., or may be additionally trained based on the in-loop filtering result of the input image.

Meanwhile, in one embodiment, the block information feature extraction unit 1620 applies channel attention to the preprocessed block information S (1623) and then executes the neural network, thereby extracting the feature (or feature map) of the block information S (1622). The channel attention may refer to a process for improving neural network performance by assigning differential weights to the output channels in consideration of the dependency between the output channels of the preprocessed block information S. In one example, the channel attention may be performed based on a quantization parameter (QP) of the input image.

The feature enhancement unit 1630 may execute a neural network using the input image feature extracted by the image feature extraction unit 1610 and the block information feature extracted by the block feature extraction unit 1620 as input, thereby extracting the enhanced feature (or feature map) of the input image (1633). At this time, the input image feature and the block information feature may be concatenated (1631) and then input to the neural network through a preprocessing process (1632). The neural network may have a dense block structure in which a plurality of convolutional layers and a plurality of activation layers are alternately repeated, and in order to obtain enhanced output results (i.e., features), the number of dense blocks may be expanded to N (where, N is an integer greater than or equal to 2). Meanwhile, as described above, the activation layers may give non-linear characteristics to the output result of the previous layer by using activation functions, such as ReLU function, sigmoid function, and Tanh function.

The image reconstruction unit 1640 may reconstruct the input image by executing the neural network using the enhanced feature of the input image output by the feature enhancement unit 1630 as input. At this time, the image reconstruction unit 1640 may separate the input image by color component and reconstruct it (1641, 1642). For example, the image reconstruction unit 1640 may perform a first reconstruction operation 1641 using the enhanced feature as input to reconstruct the luma component Y of the input image. The first reconstruction operation 1641 may be performed by up-sampling the enhanced feature at a predetermined rate and then applying a convolution operation using a 3×3 filter kernel to the up-sampling result. At this time, the number of input channels in the first reconstruction operation 1641 may be 64, and the number of output channels may be 1. Additionally, the image reconstruction unit 1640 may perform a second reconstruction operation 1642 using the enhanced feature as input to reconstruct the chroma components U and V of the input image. The second reconstruction operation 1642 may be performed by applying a convolution operation using a 3×3 filter kernel to the enhanced feature. At this time, the number of input channels in the second reconstruction operation 1642 may be 64, and the number of output channels may be 2.

As described above, the in-loop filter model 1600 according to an embodiment of the present disclosure uses block information of the input image as additional information to perform neural network-based image reconstruction on the input image, thereby further improving the quality of the input image.

Figure 17:
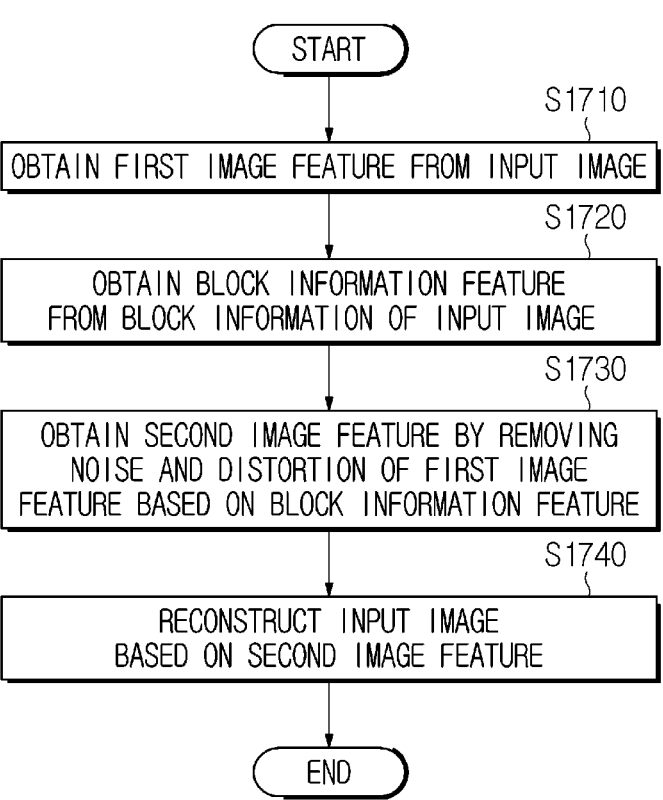
FIG. 17 is a flowchart illustrating an image encoding/ decoding method according to an embodiment of the present disclosure.

FIG. 17 is a flowchart illustrating an image encoding/decoding method according to an embodiment of the present disclosure.

The image encoding/decoding method of FIG. 17 may be performed by the image encoding apparatus of FIG. 1 or the image decoding apparatus of FIG. 2. For example, steps S1710 to S1740 may be performed by the filter units 180 and 260.

Referring to FIG. 17, the image encoding/decoding apparatus may obtain a first image feature from the input image (S1710).

The image encoding/decoding apparatus may obtain a block information feature of the input image from block information of the input image (S1720). At this time, the block information may include at least one of a block boundary map indicating a block partition structure of the input image or a block distribution map indicating encoding information of the input image. At this time, the encoding information may include at least one of prediction information (e.g., prediction mode, motion vector, etc.) or transform information (e.g., transform method (DCT2, DCT-8, or DST-7), etc.) of the input image. An example of the block boundary map is as described above with reference to FIGS. 9 and 10, and an example of the block distribution map is as described above with reference to FIG. 11.

In one embodiment, the block boundary map and the block distribution map may be grouped and reorganized into a block map group. The block information feature may be obtained from the block map group.

In another embodiment, the block boundary map and the block distribution map may be merged and reorganized into a single block information map. The block information map may be constructed by a weighted sum of the sample values of the corresponding pixels in the block boundary map and the block distribution map. The block information feature may be obtained from the block information map.

On the other hand, in one embodiment, the first image feature may be obtained individually for each of the luma and chroma components of the input image.

The image encoding/decoding apparatus may obtain a second image feature by removing the noise and distortion of the first image feature based on the block information feature (S1730).

In one embodiment, the second image feature may be obtained by adding the block information feature to the first image feature. At this time, the block information feature may be transformed into a one-dimensional vector through nonlinear transform, as described above with reference to FIG. 14 and then may be added to the first image feature in pixel units. Alternatively, the block information feature may be transformed into a two-dimensional map through non-linear transform, as described above with respect to FIG. 15, and then may be added to the first image feature in channel units.

On the other hand, in one embodiment, before the step S1730, step of applying a channel attention based on the quantization parameter of the input image to the block information may further included. In this case, the block information feature may be obtained from the block information to which the channel attention is applied.

The image encoding/decoding apparatus may reconstruct the input image based on the second image feature (S1740).

According to one embodiment of the present disclosure, the block information is obtained from the input image, the feature of the block information is added to the feature of the input image to extract the more enhanced image feature, and the input image is reconstructed based on the extracted image feature, thereby further improving the reconstruction efficiency and quality of the input image.

In FIG. 17, a plurality of steps is described as being sequentially performed, but this is only an example of the technical idea of the present disclosure. In other words, a person with ordinary skill in the art to which the present disclosure pertains will understand that various modifications and changes can be made by changing the order of steps shown in FIG. 17 and performing some of the plurality of steps in parallel, without departing from the essential characteristics of the present disclosure.

On the other hand, the steps shown in FIG. 17 may be implemented as computer-readable code in a computer-readable recording medium. The computer-readable recording medium may include all kinds of recording devices storing data readable by a computing system. For example, the computer-readable recording medium may include magnetic storage media (e.g., ROMs, floppy disks, hard disks, etc.), optical reading media (e.g., CDs, DVDs, etc.) and storage media such as carrier waves (e.g., transmission through the Internet). In addition, the computer-readable recording medium can be distributed over a computer system connected to a network so that computer-readable code is stored therein and executed therefrom in a decentralized manner.

Figure 18:
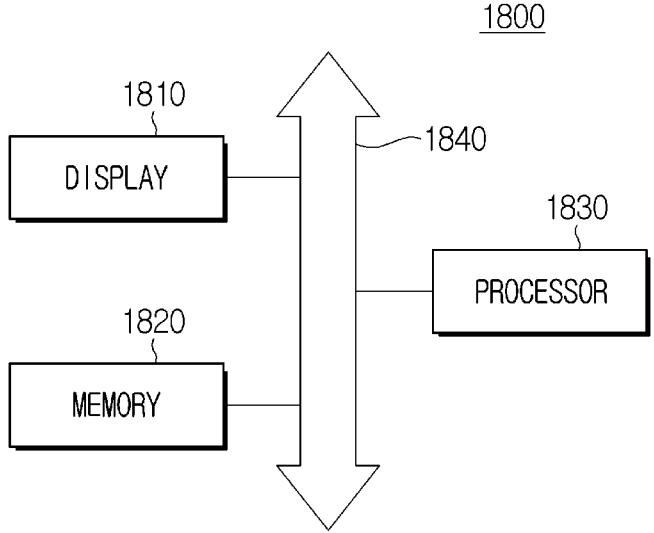
FIG. 18 is a block diagram schematically showing an electronic device including an image coding/decoding apparatus according to an embodiment of the present disclosure.

FIG. 18 is a block diagram schematically showing an electronic device including an image coding/decoding apparatus according to an embodiment of the present disclosure.

Referring to FIG. 18, the electronic device 1800 is a comprehensive concept comprising a smartphone, a tablet PC, a smart wearable device, and the like, and may include a display 1810, a memory 1820 and a processor 1830.

The display 1810 may include an organic light emitting diode (OLED), a liquid crystal display (LCD), a plasma display panel (PDP) display, etc., and may display various images on the screen. The display 1810 may also provide a user interface function. For example, the display 1810 may provide a unit for inputting various commands.

The memory 1820 may be a storage medium that stores data or multimedia data required for the operation of the electronic device 1800. The memory 1820 may include a storage device based on a semiconductor device. For example, the memory 1820 may include a dynamic random access memory device such as DRAM, SDRAM (Synchronous DRAM), DDR SDRAM (Double Data Rate SDRAM), LPDDR SDRAM (Low Power Double Data Rate SDRAM), GDDR SDRAM (Graphics Double Data Rate SDRAM), DDR2 SDRAM, DDR3 SDRAM, DDR4 SDRAM or a resistive memory device such as phase change random access memory (PRAM), magnetic random access memory (MRAM) and resistive random access memory (PRAM). In addition, the memory 1820 may include at least one of a solid state drive (SSD), a hard disk drive (HDD) or an optical drive (ODD) as a storage device.

The processor 1830 may perform the image encoding/decoding method described above with reference to FIGS. 1 to 17 based on a neural network. Specifically, the processor 1830 may obtain a first image feature from the input image based on the neural network. The processor 1830 may obtain a block information feature of the input image from the block information of the input image, based on the neural network. The processor 1830 may obtain a second image feature by removing the noise and distortion of the first image feature based on the block information feature, based on the neural network. In addition, the processor 1830 may reconstruct the input image based on the neural network based on the second image feature. At this time, the block information may include at least one of a block boundary map indicating a block partition structure of the input image and a block distribution map indicating the encoding information of the input image.

The processor 1830 may be a Central Processing Unit (CPU) or a microprocessor unit (MCU), a system-on chip (SOC), etc., and may exchange various data with the display 1810 and/or memory 1820 through a bus 1840.

The present invention is not limited by the above-described embodiments and accompanying drawings, and is limited by the accompanying claims. Those skilled in the art will appreciate that various substitutions, modifications and changes are possible, without departing from the scope and spirit of the invention as disclosed in the accompanying claims and may also be within the scope of the present invention.

INDUSTRIAL APPLICABILITY

The embodiments of the present disclosure may be used to encode or decode an image.

The invention claimed is:
1. An image decoding method using a neural network-based in-loop filter, comprising:
   obtaining a first image feature from an input image;
   obtaining a block information feature of the input image from block information of the input image;
   obtaining a second image feature based on the first image feature and the block information feature; and
   reconstructing the input image based on the second image feature, wherein the block information comprises at least one of a block boundary map indicating a block partition structure of the input image or a block distribution map indicating encoding information of the input image, wherein the second image feature is obtained by adding the block information feature to the first image feature, wherein the block information feature is transformed into a two-dimensional map and then is added to the first image feature in channel units.

2. The image decoding method of claim 1, wherein the block boundary map and the block distribution map are grouped and reorganized into a block map group, and wherein the block information feature is obtained from the block map group.

3. The image decoding method of claim 1, wherein the block boundary map and the block distribution map are merged and reorganized into a single block information map, and wherein the block information feature is obtained from the block information map.

4. The image decoding method of claim 3, wherein the block information map is constructed by a weighted sum of sample values of corresponding pixels in the block boundary map and the block distribution map.

5. The image decoding method of claim 1, wherein the encoding information comprises at least one of prediction information or transform information of the input image.

6. The image decoding method of claim 1, wherein the first image feature is individually obtained with respect to each of a luma component and chroma component of the input image.

7. The image decoding method of claim 1, further comprising applying a channel attention based on a quantization parameter of the input image to the block information, wherein the block information feature is obtained from the block information to which the channel attention is applied.

8. An image encoding method using a neural network-based in-loop filter, comprising:

obtaining a first image feature from an input image;

obtaining a block information feature of the input image from block information of the input image;

obtaining a second image feature based on the first image feature and the block information feature; and reconstructing the input image based on the second image feature, wherein the block information comprises at least one of a block boundary map indicating a block partition structure of the input image or a block distribution map indicating encoding information of the input image, wherein the second image feature is obtained by adding the block information feature to the first image feature, wherein the block information feature is transformed into a two-dimensional map and then is added to the first image feature in channel units.

9. The image encoding method of claim 8, wherein the block boundary map and the block distribution map are grouped and reorganized into a block map group, and wherein the block information feature is obtained from the block map group.

10. The image encoding method of claim 8, wherein the block boundary map and the block distribution map are merged and reorganized into a single block information map, and wherein the block information feature is obtained from the block information map.

11. The image encoding method of claim 10, wherein the block information map is constructed by a weighted sum of sample values of corresponding pixels in the block boundary map and the block distribution map.

12. The image encoding method of claim 8, wherein the first image feature is individually obtained with respect to each of a luma component and chroma component of the input image.

13. The image encoding method of claim 8, further comprising applying a channel attention based on a quantization parameter of the input image to the block information, wherein the block information feature is obtained from the block information to which the channel attention is applied.

14. A non-transitory computer-readable recording medium for storing a bitstream generated by an image encoding method using a neural network-based in-loop filter, comprising instructions stored thereon, that when executed on a processor, performs the image encoding method comprising:

obtaining a first image feature from an input image;

obtaining a block information feature of the input image from block information of the input image;

obtaining a second image feature based on the first image feature and the block information feature; and reconstructing the input image based on the second image feature, wherein the block information comprises at least one of a block boundary map indicating a block partition structure of the input image or a block distribution map indicating encoding information of the input image, wherein the second image feature is obtained by adding the block information feature to the first image feature, wherein the block information feature is transformed into a two-dimensional map and then is added to the first image feature in channel units.

* * * * *